(12) United States Patent
Zimoto et al.

(10) Patent No.: US 7,747,800 B2
(45) Date of Patent: Jun. 29, 2010

(54) STORAGE SYSTEM COMPRISING POWER SAVING FUNCTION

(75) Inventors: Yoshifumi Zimoto, Odawara (JP); Go Uehara, Odawara (JP); Kenji Muraoka, Odawara (JP); Masaaki Kobayashi, Odawara (JP)

(73) Assignee: Hitachi, Ltd., Tokyo (JP)

( * ) Notice: Subject to any disclaimer, the term of this patent is extended or adjusted under 35 U.S.C. 154(b) by 340 days.

(21) Appl. No.: 11/699,424

(22) Filed: Jan. 30, 2007

(65) Prior Publication Data

US 2008/0126702 A1 May 29, 2008

(30) Foreign Application Priority Data

Nov. 28, 2006 (JP) ............................. 2006-320579

(51) Int. Cl.
*G06F 13/12* (2006.01)
(52) U.S. Cl. ................. 710/74; 710/5; 710/7; 713/300; 713/310; 713/320
(58) Field of Classification Search ........................ None
See application file for complete search history.

(56) References Cited

U.S. PATENT DOCUMENTS

| 5,961,613 | A | * | 10/1999 | DeNicola ..................... 710/18 |
| 2005/0259345 | A1 | | 11/2005 | Hakamata et al. |
| 2007/0294552 | A1 | * | 12/2007 | Kakihara et al. ............ 713/320 |
| 2008/0040543 | A1 | * | 2/2008 | Yamazaki et al. ........... 711/114 |

FOREIGN PATENT DOCUMENTS

JP    2000-293314    10/2000

* cited by examiner

*Primary Examiner*—Eron J Sorrell
(74) *Attorney, Agent, or Firm*—Brundidge & Stanger, P.C.

(57) ABSTRACT

A storage system constituted such that power saving to an administrator-desired storage device can be performed from a management device. That is, the storage system comprises a power-saving indication receiving section for receiving from a management console a power-saving indication specifying at least one storage device of a plurality of RAID groups, a plurality of logical units, and a plurality of physical storage devices; and a power-saving controller for saving on power to one or more physical storage devices corresponding to the storage device specified in this power-saving indication.

19 Claims, 27 Drawing Sheets

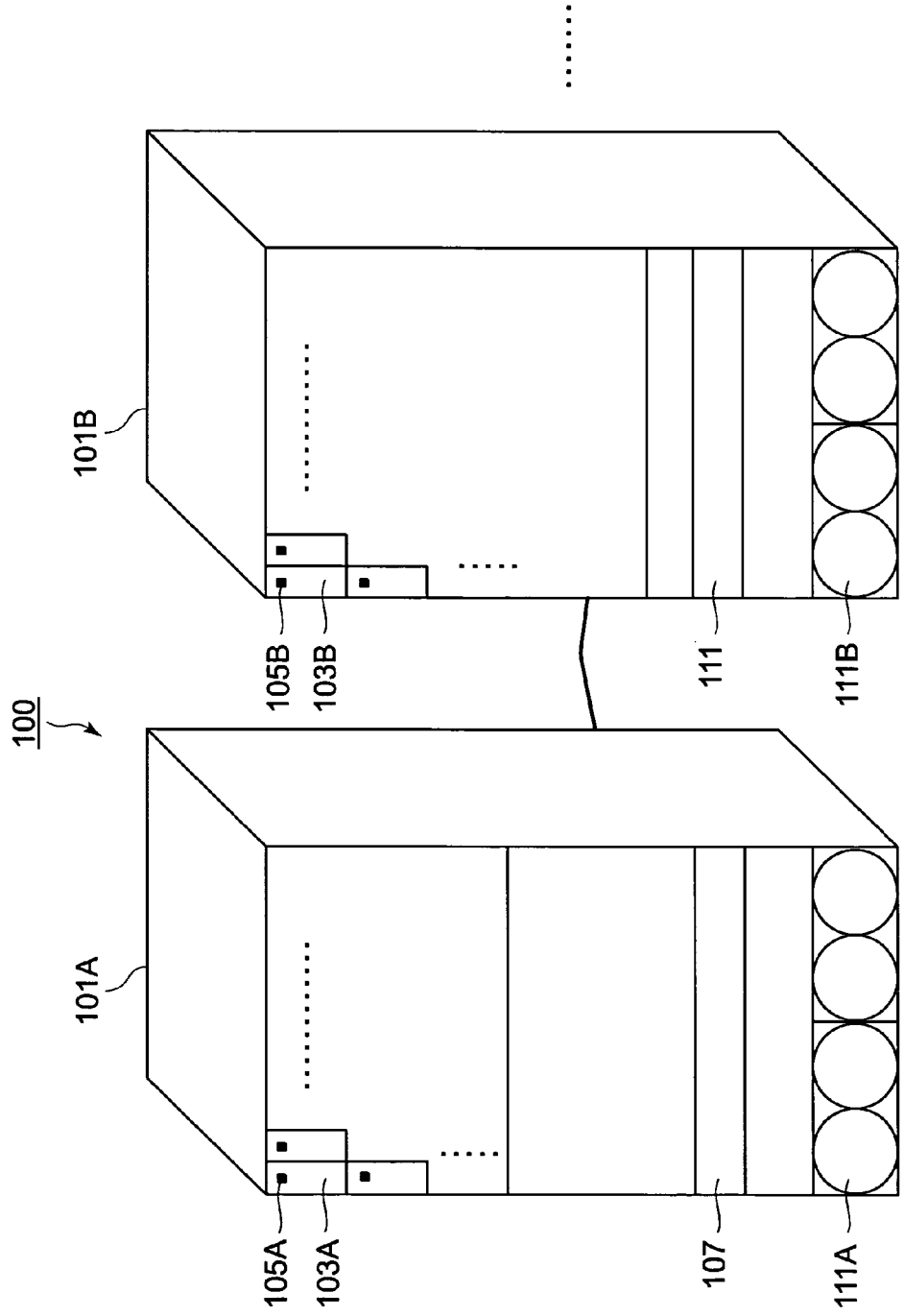

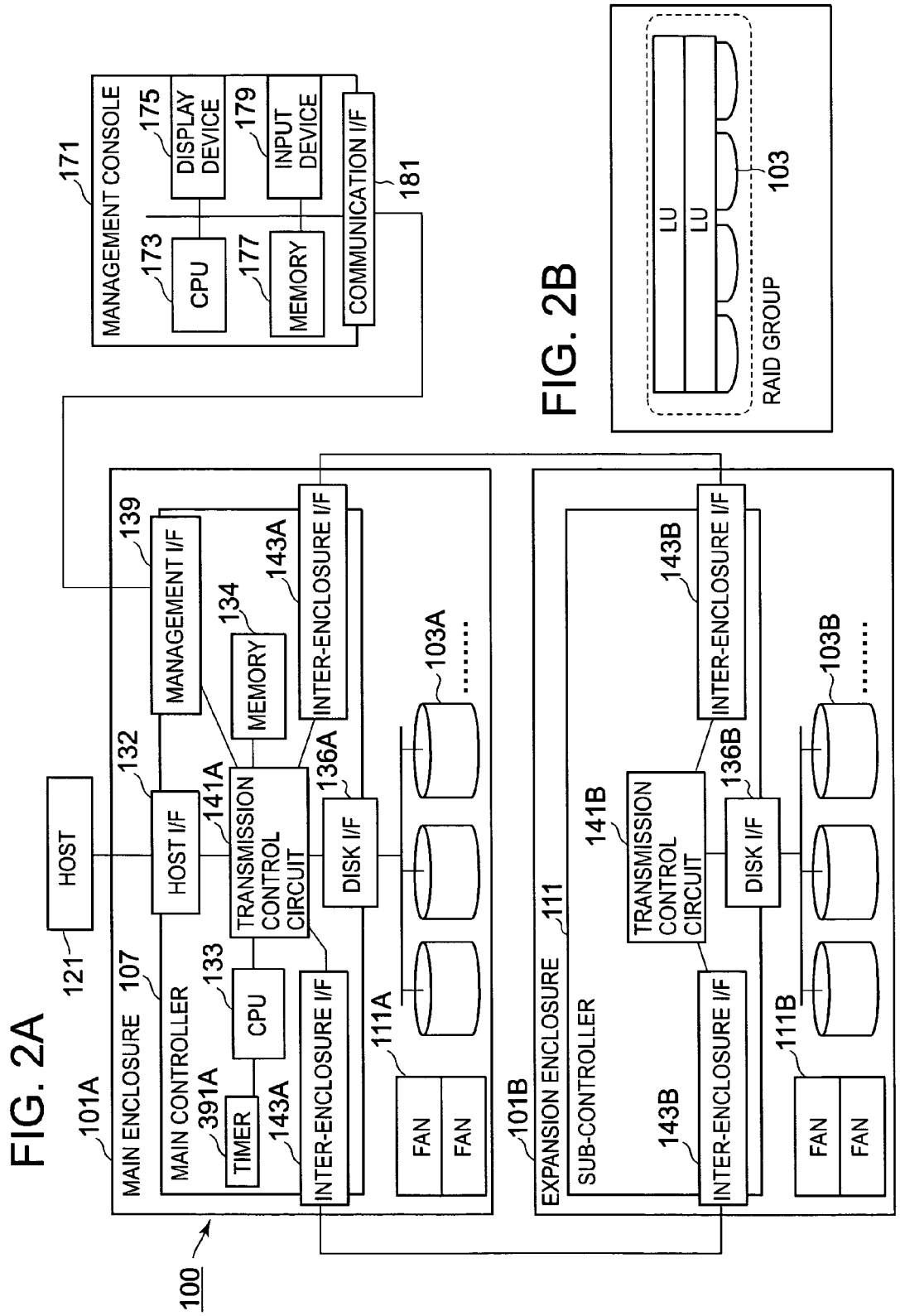

FIG. 5

LU MANAGEMENT TABLE 255

| RG ID | STORAGE LUN | HOST LUN | LU ATTRIBUTE | POWER-SAVING STATUS | I/O RESPONSE STATUS | NORMAL DIRTY DATA INFORMATION (ADDRESS/SIZE) | FAILURE DIRTY DATA INFORMATION (ADDRESS/SIZE) |
|---|---|---|---|---|---|---|---|
| 0 | 0 | 0 | NORMAL | SPIN-UP | NORMAL | 1000 / 10 | NONE |
| 0 | 1 | 1 | NORMAL | SPIN-UP | NOT READY | 3000 / 10 | 4000 / 20 |
| 1 | 2 | 2 | NORMAL | SPIN-DOWN | NOT READY | NONE | NONE |
| 1 | 3 | 3 | NORMAL | SPIN-DOWN | NOT READY | NONE | NONE |
| 2 | 4 | — | NORMAL | SPIN-DOWN PROCESSING | NOT READY | NONE | NONE |
| 3 | 5 | 4 | NORMAL | I/O MONITORING | NORMAL | NONE | NONE |
| 3 | 6 | 5 | NORMAL | I/O MONITORING | NORMAL | NONE | NONE |
| 3 | 7 | 6 | FAILURE | SPIN-UP | NOT READY | NONE | NONE |
| 4 | 8 | — | I/O | SPIN-UP | — | NONE | NONE |
| 4 | 9 | — | NORMAL | SPIN-UP PROCESSING | — | NONE | NONE |
| ...... | ...... | ...... | ...... | ...... | ...... | ...... | ...... |

FIG. 6

DISK MANAGEMENT TABLE 257

| RG ID | DISK ID | STORAGE LU RANGE | POWER-SAVING STATUS | SPIN-DOWN COUNT | NEXT CHECK START ADDRESS | LAST CHECK END TIME (YEAR/MONTH/DAY/ HOUR/MINUTE/SECOND) |
|---|---|---|---|---|---|---|
| 0 | 0-0 | 0(0-99)<br>1(0-99) | SPIN-UP | 30 | 0x300 | 2006/04/01/12/00 |
| 0 | 0-1 | 0(100-199)<br>1(100-199) | SPIN-UP | 30 | 0x100 | 2006/04/01/12/10 |
| 0 | 0-2 | 0(200-299)<br>1(200-299) | SPIN-UP | 30 | 0x200 | 2006/04/01/12/20 |
| 0 | 0-3 | 0(300-399)<br>1(300-399) | SPIN-UP | 30 | 0 | 2006/04/01/12/00 |
| 1 | 0-4 | 2(0-199) | SPIN-DOWN | 2 | 0x400 | 2006/02/01/00/00 |
| 1 | 0-5 | 2(200-399) | SPIN-DOWN | 2 | 0 | 2006/02/01/12/10 |
| 1 | 0-6 | 3(0-199) | SPIN-DOWN | 2 | 0x300 | 2006/04/01/12/20 |
| 1 | 0-7 | 3(200-399) | SPIN-DOWN | 2 | 0 | 2006/04/01/12/00 |
| 2 | 0-8 | 4(0-199) | SPIN-DOWN PROCESSING | 50 | 0 | 2006/03/01/12/00 |
| 2 | 0-9 | 4(200-399) | SPIN-DOWN PROCESSING | 100 | 0 | 2006/03/01/12/10 |
| SPARE | 1-10 | — | — | — | 0 | 2006/05/01/12/10 |
| ...... | ...... | ...... | ...... | ...... | ...... | ...... |

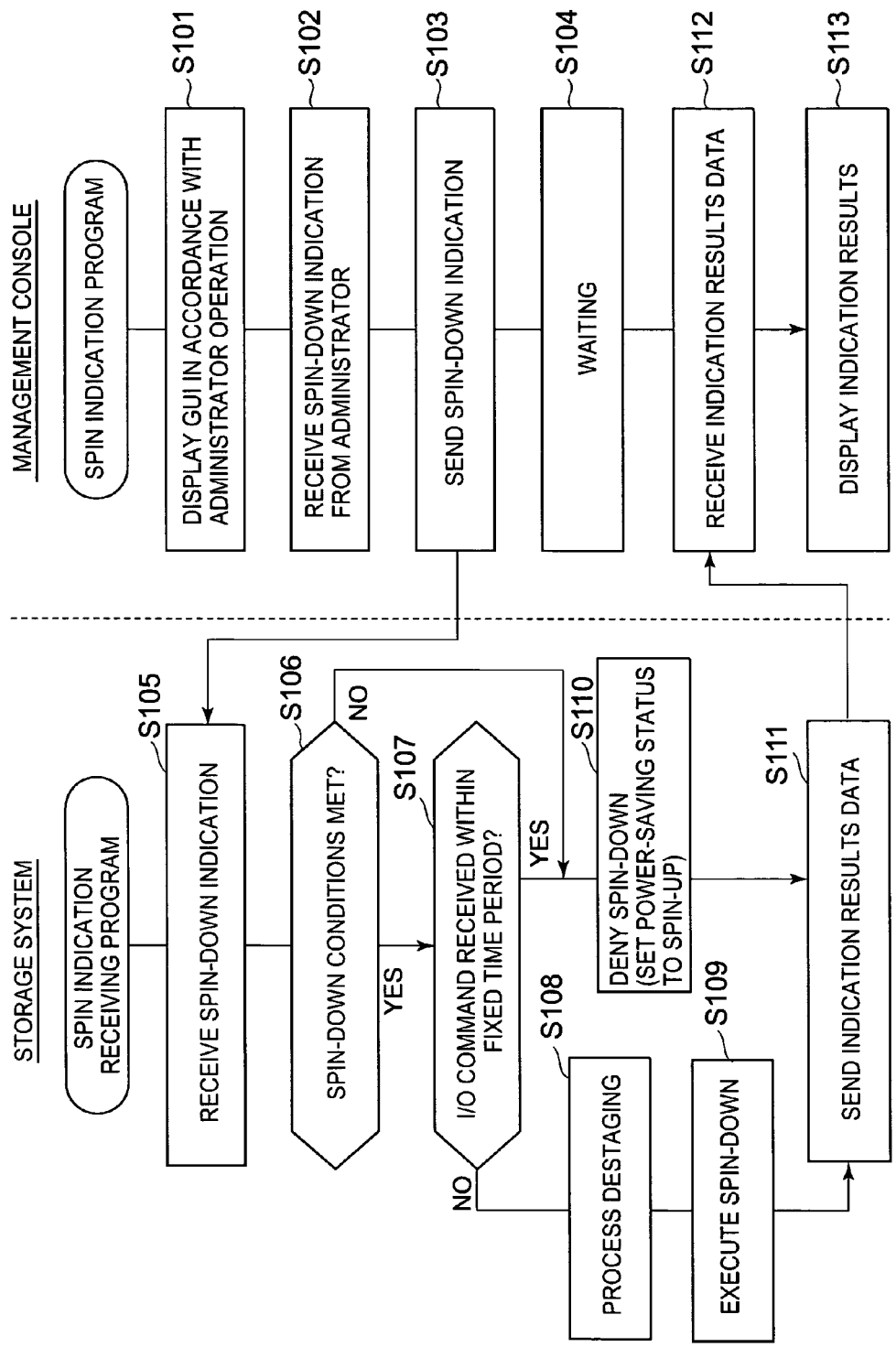

FIG. 8A

| RG ID | STORAGE LUN | HOST LUN | LU ATTRIBUTE | POWER-SAVING STATUS |
|---|---|---|---|---|
| ☑ 0 | ☐ 0 | 0 | NORMAL | SPIN-UP |
| | ☐ 1 | 1 | NORMAL | SPIN-UP |
| ☐ 1 | ☐ 2 | 2 | NORMAL | SPIN-DOWN |
| | ☑ 3 | 3 | NORMAL | SPIN-DOWN |
| ☐ 2 | ☐ 4 | | NORMAL | SPIN-DOWN PROCESSING |
| …… | …… | …… | …… | …… |

[EXECUTE SPIN-DOWN] [SWITCH SCREENS]
[EXECUTE SPIN-UP]

FIG. 8B

| RG ID | DISK ID | POWER-SAVING STATUS |
|---|---|---|
| ☐ 0 | ☑ 0-0 | SPIN-UP |
| | ☐ 0-1 | SPIN-UP |
| | ☐ 0-2 | SPIN-UP |
| | ☐ 0-3 | SPIN-UP |
| ☐ 1 | ☑ 0-4 | SPIN-DOWN |
| | ☐ 0-5 | SPIN-DOWN |
| | ☐ 0-6 | SPIN-DOWN |
| | ☐ 0-7 | SPIN-DOWN |
| ☐ 2 | ☐ 0-8 | SPIN-DOWN PROCESSING |
| | ☐ 0-9 | SPIN-DOWN PROCESSING |
| …… | …… | …… |

[EXECUTE SPIN-DOWN] [SWITCH SCREENS]
[EXECUTE SPIN-UP]

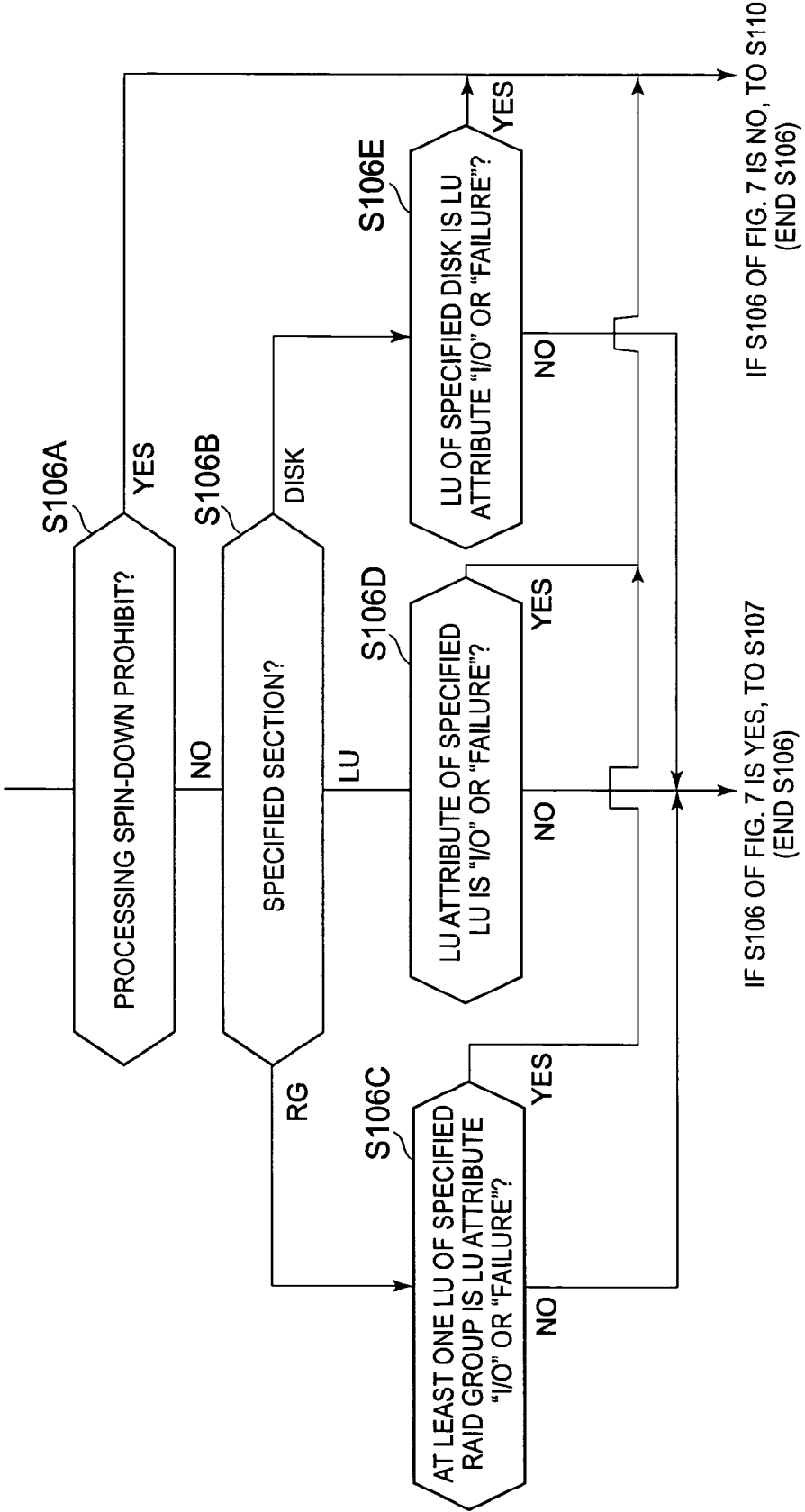

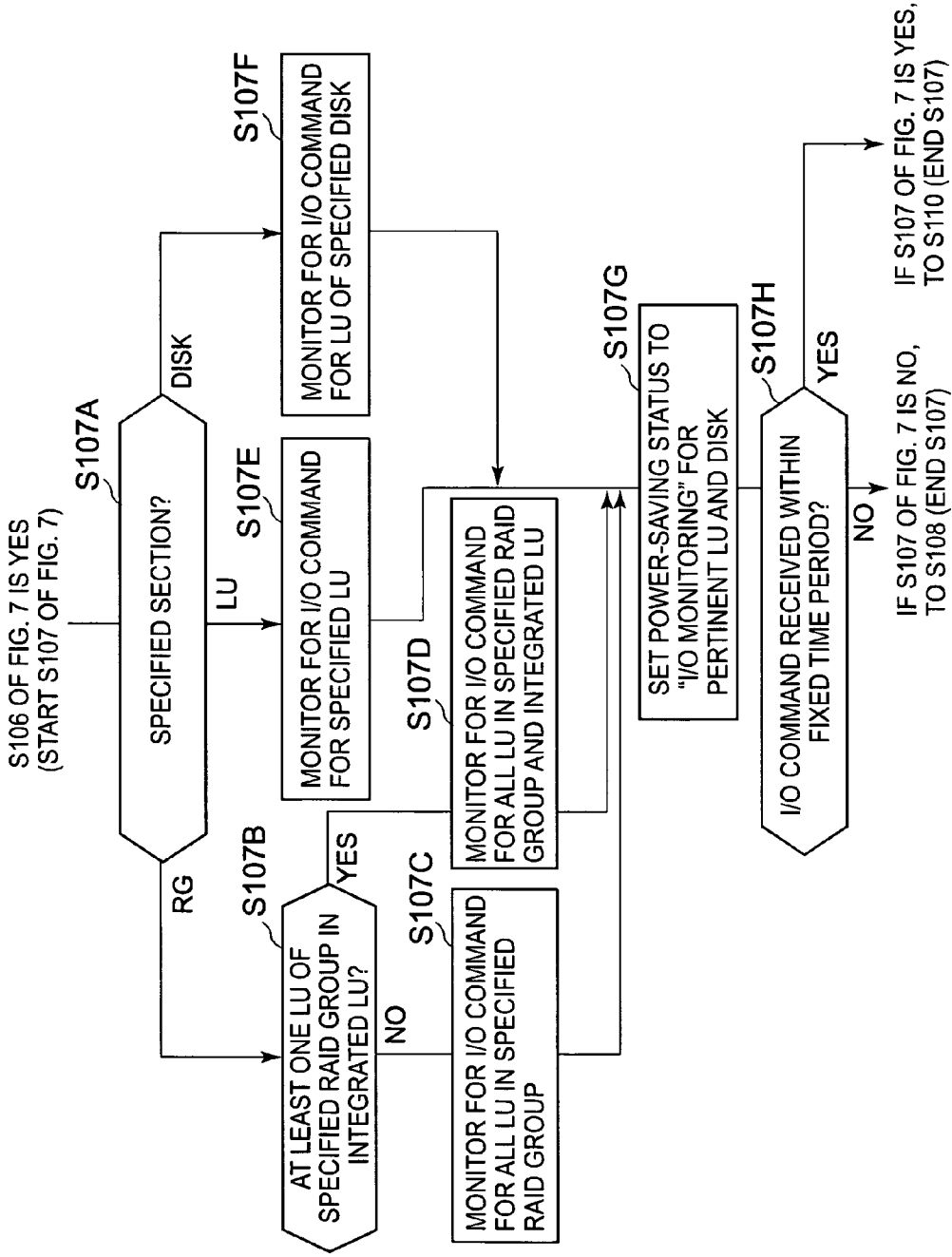

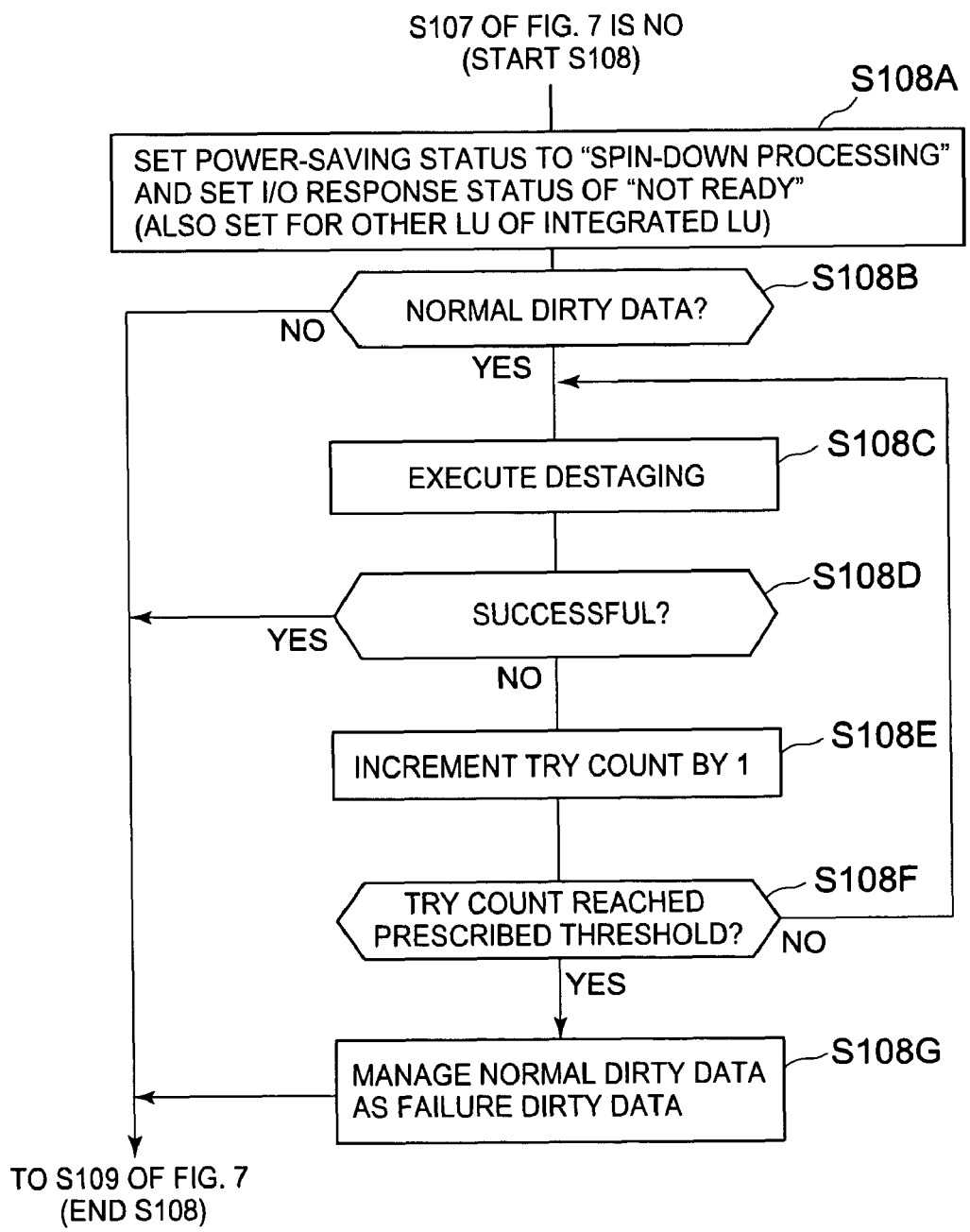

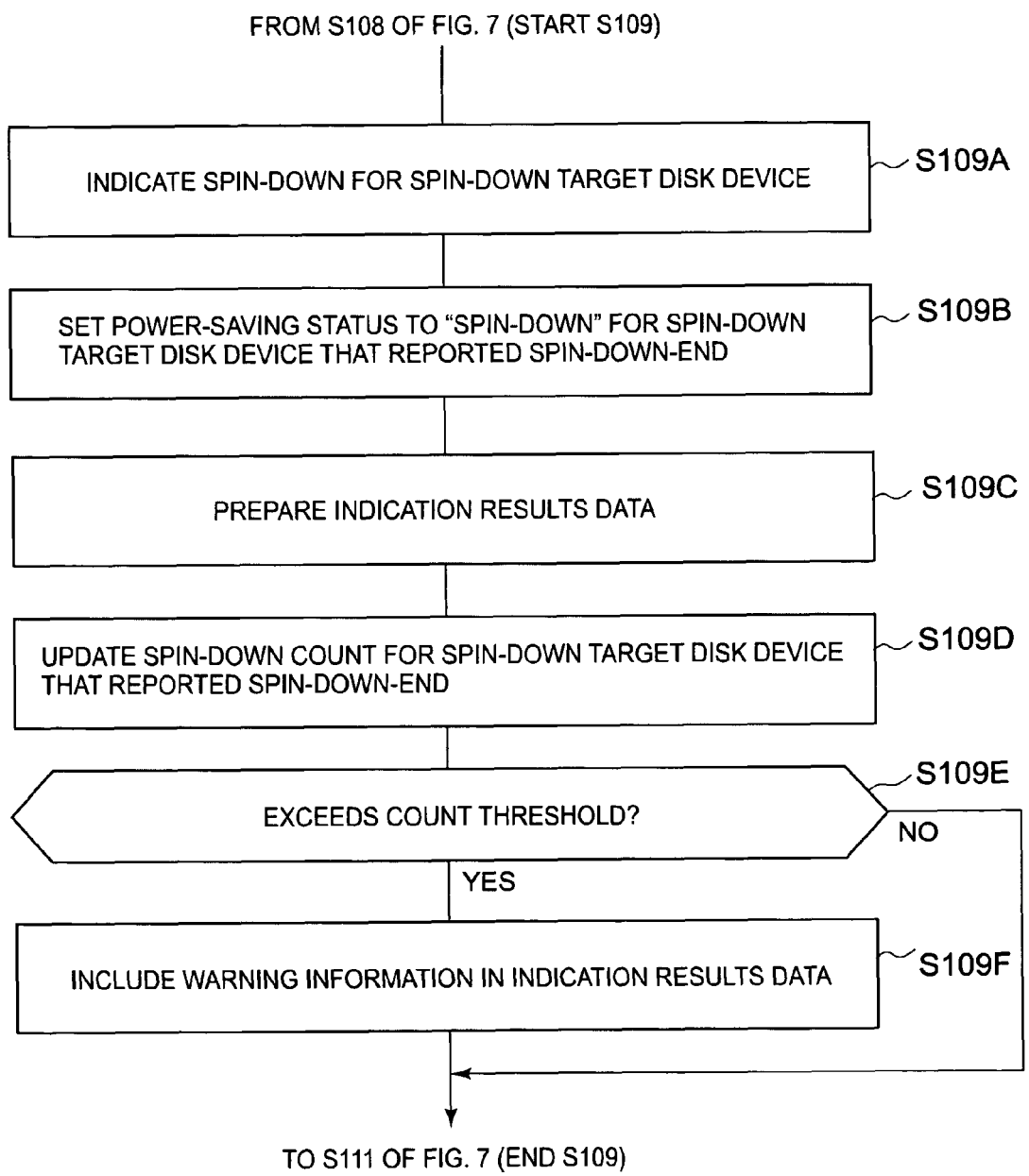

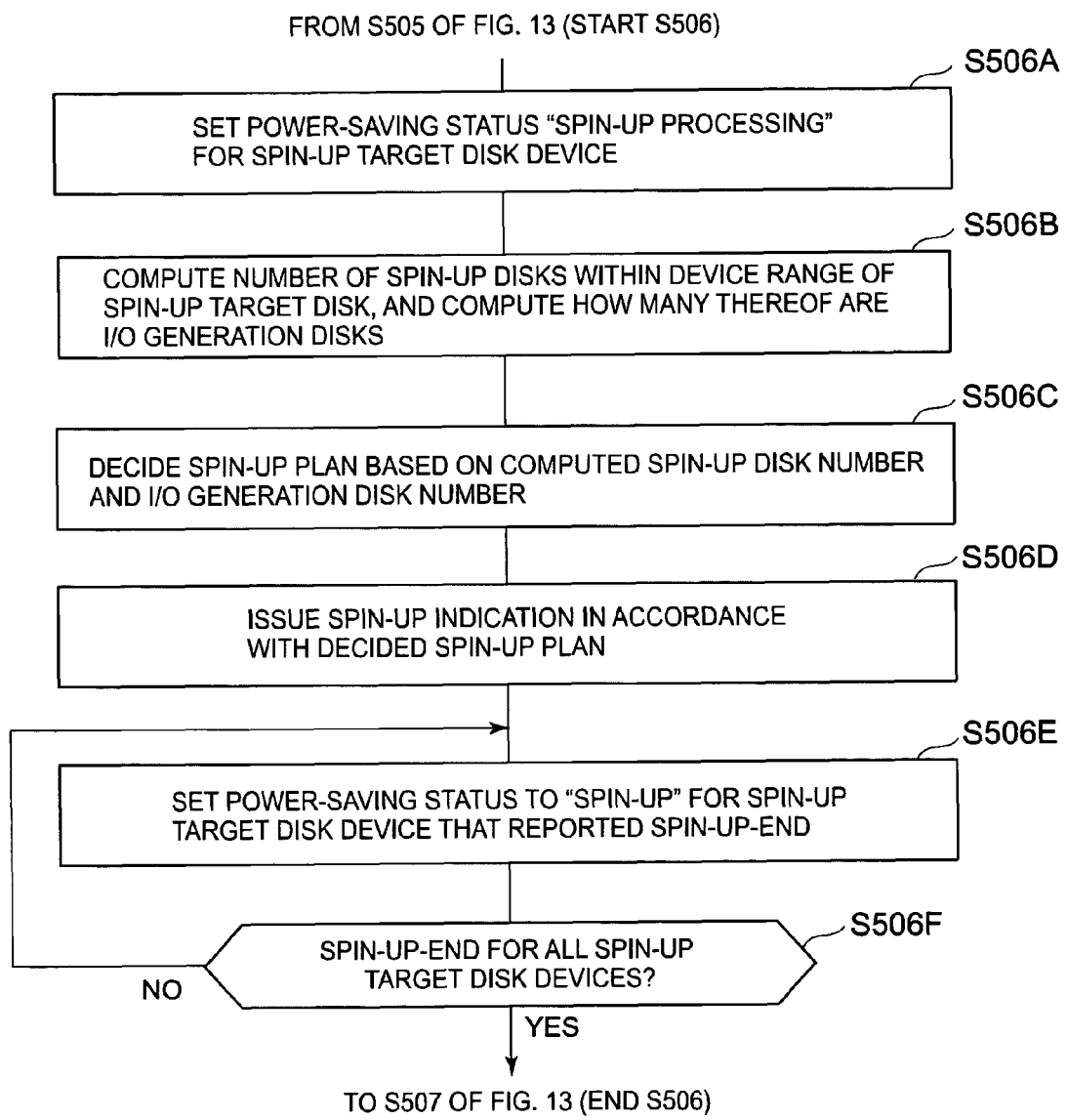

FIG. 16A ( I/O CONTROL PROGRAM )

S601 — RECEIVE I/O COMMAND

S602 — IDENTIFY I/O RESPONSE STATUS

S603 — EXECUTE RESPONSE BASED ON I/O RESPONSE STATUS

FIG. 16B ( EVENT EXECUTION CONTROL PROGRAM )

S611 — MONITOR FOR EVENT GENERATION

S612 — EVENT GENERATED? — NO (loop back) / YES

S613 — APPROVE/DISAPPROVE EVENT GENERATION AND/OR CONTROL POWER-SAVING STATUS OF TARGET LU AND TARGET DISK BASED ON TYPE OF GENERATED EVENT AND POWER-SAVING STATUS OF TARGET LU AND TARGET DISK

FIG. 16C ( SETTING CONTROL PROGRAM )

S621 — RECEIVE SETTING INDICATION

S622 — CONTROL APPROVAL/DISAPPROVAL OF SETTING BASED ON TYPE OF RECEIVED SETTING INDICATION AND POWER-SAVING STATUS OF TARGET LU AND TARGET DISK

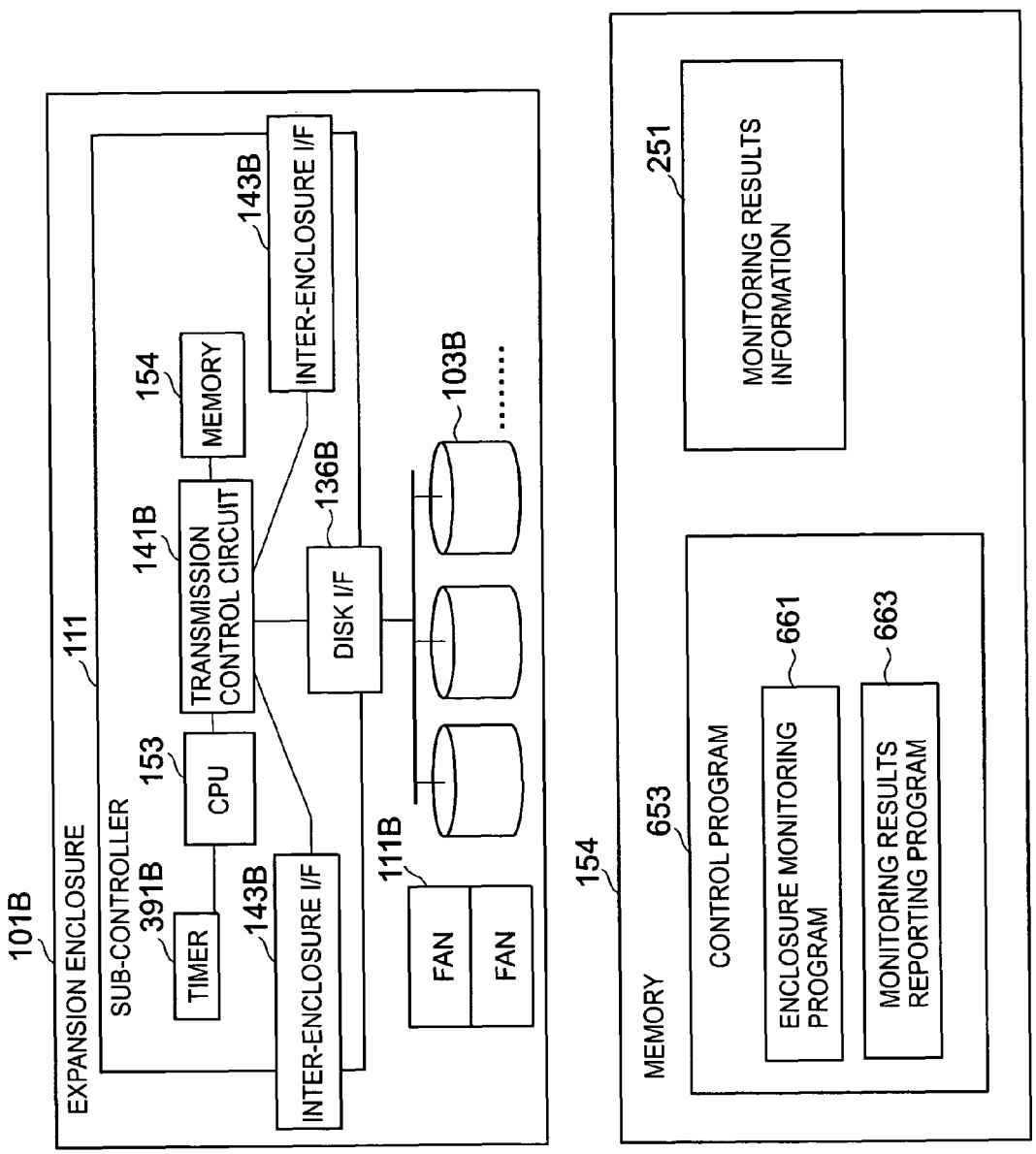

FIG. 25

| | | |
|---|---|---|
| I/O | COPY RELATED | • UPDATE LU (LU FOR WHICH PAIR STATUS OF LU PAIR UPDATES SECONDARY LU)<br>• POOL LU (LU TO WHICH DIFFERENCE OF CERTAIN LU WRITTEN EACH TIME THIS CERTAIN LU IS UPDATED)<br>• DM LU (LU TO WHICH DIFFERENCE DATA WITH CERTAIN LU IN CACHE MEMORY AREA IS WRITTEN WHEN CACHE MEMORY AREA POWER IS OFF)<br>• COMMAND DEVICE (LU IN WHICH COPY-RELATED COMMAND ACCUMULATES) |
| | MIGRATION RELATED | • MIGRATION-IN-PROGRESS LU (LU THAT IS MIGRATION DESTINATION FOR DATA INSIDE A CERTAIN LU, AND TO WHICH DATA IS BEING WRITTEN)<br>• LU FOR WHICH PAIR STATUS NOT CANCELED AFTER COMPLETING MIGRATION |
| | NAS RELATED | • NAS SYSTEM LU (LU REFERENCED BY OS FOR OPERATING STORAGE SYSTEM AS A NAS |
| | OTHER | • FORMATTING-IN-PROGRESS LU (LU FOR WHICH FORMATTING IN BEING PERFORMED)<br>• PARITY RECOVERY-IN-PROGRESS LU (LU TO WHICH RECOVERED DATA IS BEING WRITTEN) |
| FAILURE | | • LU COMPRISING BLOCKED DISK DEVICE<br>• WRITE-INCOMPLETE LU (LU IN WHICH WRITE-INCOMPLETE OCCURRED)<br>• COPYING ERROR LU (LU OF LU PAIR TO WHICH COPYING FAILED) |

FIG. 26

| EVENT | POWER-SAVING STATUS | | | |
|---|---|---|---|---|
| | I/O MONITORING | SPIN-DOWN PROCESSING | SPIN-DOWN | SPIN-UP PROCESSING |
| LU PAIR FORMATION | CANCEL SPIN-DOWN | PROHIBIT | PROHIBIT | PROHIBIT |
| EXECUTION OF LU PAIR COPY | CANCEL SPIN-DOWN | PROHIBIT | PROHIBIT | PROHIBIT |
| SPLITTING OF LU PAIR | PERMIT | PERMIT | PERMIT | PERMIT |
| FAILURE DETECTION | CANCEL SPIN-DOWN | CANCEL SPIN-DOWN | CANCEL SPIN-DOWN | CANCEL SPIN-DOWN |
| FAILURE RECOVERY | PERMIT | PERMIT AFTER AUTOMATIC SPIN-UP (THEREAFTER, AUTOMATIC SPIN-DOWN) | PERMIT AFTER AUTOMATIC SPIN-UP (THEREAFTER, AUTOMATIC SPIN-DOWN) | PERMIT AFTER SPIN-UP |
| ....... | ....... | ....... | ....... | ....... |

FIG. 27

IF YOU WISH TO USE INTEGRATED LU, PLEASE CHANGE
SPIN-DOWN SETTING OF LU CONSTITUTING INTEGRATED LU.
(HOST-SPECIFIED HOST LU COULD BE IN ERROR.)

STORAGE SYSTEM COMPRISING POWER SAVING FUNCTION

CROSS-REFERENCE TO PRIOR APPLICATION

This application relates to and claims the benefit of priority from Japanese Patent Application number 2006-320579, filed on Nov. 28, 2006 the entire disclosure of which is incorporated herein by reference.

BACKGROUND

The present invention relates to saving power in a physical storage device of a storage system.

A storage system comprising a plurality of physical storage devices is known. This type of storage system, for example, includes a disk array apparatus comprising a plurality of disk devices (for example, hard disk drives) in an array. As technology related to saving power in a disk array apparatus, for example, there is the technology disclosed in Japanese Patent Laid-open No. 2000-293314, which is referred to here as Literature 1. According to Literature 1, a disk array apparatus controls the power saving of a disk device (selects power ON/OFF or a power-saving mode) subsequent to the passage of a predetermined period of time during which there has not been an access from an upper-level device. Further, when there is an access from an upper-level device, if the power to the access destination disk device is OFF, the disk array apparatus executes the access subsequent to turning ON the power to this disk device.

For example, a person might want to save power in a desired storage device. One method for realizing this could be such that a power-saving indication, which specifies a user-desired storage device, is sent to a storage system from an upper-level computer, and, in accordance with this power-saving indication, the storage system specifies one or more physical storage devices of the storage device specified by this power-saving indication, and subjects this one or more physical storage devices to power savings. An upper-level computer, for example, can include a physical host computer, a virtual host computer provided on either one or a plurality of host computers, and an application.

However, a storage device of a storage system can be a storage device that is shared by a plurality of upper-level computers. If one or more physical storage devices of such a storage device are subjected to power savings in accordance with a power-saving indication from a certain upper-level computer of a plurality of upper-level computers, when another upper-level computer of this plurality of upper-level computers is either in the process of using or is about to use this storage device, processing to cancel power saving must be performed separately in order to utilize this storage device.

SUMMARY

Therefore, an object of the present invention is to realize power savings in a user-desired storage device of a plurality of storage devices comprising a storage system so as to avoid impeding storage device usage as much as possible.

Other objects of the present invention should become clear from the following explanation.

A storage system is constituted such that saving on power to an administrator-desired storage device can be performed from a management server. More specifically, the storage system comprises a power-saving indication receiving section for receiving from a management server a power-saving indication that specifies at least one storage device of a plurality of RAID groups, a plurality of logical units and a plurality of physical storage devices; and a power-saving controller for saving on power to one or more physical storage devices corresponding to the storage device specified by this power-saving indication.

BRIEF DESCRIPTION OF THE DRAWINGS

FIG. 1 shows an example of the external appearance of a storage system related to a first embodiment of the present invention;

FIG. 2A shows a block diagram of an entire system related to the first embodiment of the present invention;

FIG. 2B shows an example of the corresponding relationship between a RAID group, LUs and disk devices;

FIG. 5 shows a block diagram of an LU management table 255;

FIG. 6 shows a block diagram of a disk management table 257;

FIG. 7 shows an example of the overall flow of processing related to the indication and execution of a spin-down;

FIG. 8A is an example of a first GUI displayed in S101 of FIG. 7;

FIG. 8B is an example of a second GUI displayed in S101 of FIG. 7;

FIG. 9 shows an example of the detailed flow of processing executed in S106 of FIG. 7;

FIG. 10 shows an example of the detailed flow of processing executed in S107 of FIG. 7;

FIG. 11 shows an example of the detailed flow of processing executed in S108 of FIG. 7;

FIG. 12 shows an example of the detailed flow of processing executed in S109 of FIG. 7;

FIG. 14 shows an example of the detailed flow of processing executed in S506 of FIG. 13;

FIG. 16A shows an example of the flow of processing executed by an I/O control program 261;

FIG. 16B shows an example of the flow of processing executed by an event execution control program 267;

FIG. 16C shows an example of the flow of processing executed by setting control program 275;

FIG. 21A shows a block diagram of an expansion enclosure 101B in a second embodiment of the present invention;

FIG. 21B is a schematic diagram of the computer programs and information stored in a memory 154 of a sub-controller 111';

FIG. 25 is a table showing concrete examples of a LU of LU attribute "I/O" and a LU of LU attribute "failure," respectively;

FIG. 26 is a table showing a concrete example of the relationship between an event and the approval or disapproval of the execution thereof; and FIG. 27 shows an example of a message displayed by the management console 171 in relation to an integrated LU.

DESCRIPTION OF THE PREFERRED EMBODIMENTS

Figure 3A:
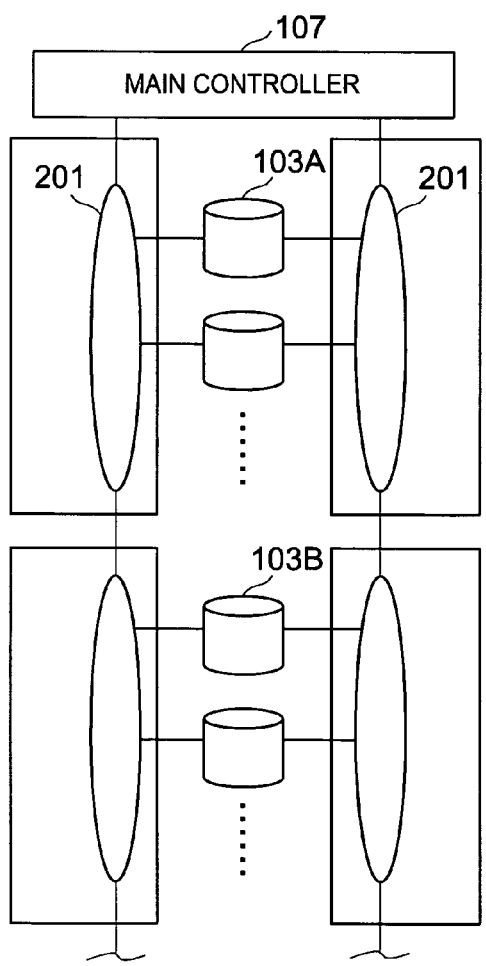
FIG. 3A shows an example in which respective disk devices 103A and 103B are connected via an FC-AL 201 to a main controller 107.

A number of embodiments of the present invention will be explained hereinbelow, and, for example, an overview of one of these is as follows.

A storage system comprises a power-saving indication receiving section for receiving from a management console a power-saving indication that specifies at least one storage device of a plurality of RAID groups, a plurality of logical units and a plurality of physical storage devices; and a power-saving controller for saving on power to one or more physical storage devices corresponding to the storage device specified by this power-saving indication. When managing a plurality of upper-level computers, the management console, for example, can work in concert with the plurality of upper-level computers.

In one embodiment, a storage system further comprises a logical unit attribute identification section. The logical unit attribute identification section identifies the logical unit attribute of a logical unit corresponding to a storage device specified in a received power-saving indication. In this case, the power-saving controller determines whether or not this identified logical unit attribute is a prescribed logical unit attribute, and if it is a prescribed logical unit attribute, saves on power to one or more physical storage devices corresponding to the above-mentioned specified storage device, and if it is not a prescribed logical unit attribute, does not save on power to one or more physical storage devices corresponding to the above-mentioned specified storage device. Here, "save on power" refers to indicating (for example, issuing a power-saving execution command) the saving of power (for example, power OFF or spin-down, which will be explained hereinbelow) to a physical storage device in accordance with a power-saving indication from the management console. Conversely, "do not save on power" refers to not indicating the saving on power to a physical storage device, and, for example, can be rephrased as denying a power-saving indication from the management console.

This storage system has a storage area for storing corresponding relationship information, which is information denoting the mutual corresponding relationships between a plurality of RAID groups, a plurality of logical units, and a plurality of physical storage devices, and logical unit attribute information, which is information denoting the logical unit attribute for each of a plurality of logical units. The logical unit attribute identification section can identify a logical unit attribute by referencing the corresponding relationship information and logical unit attribute information in this storage area.

Saving on power to a physical storage device by simply following an indication from the administrator can adversely affect the storage system. For example, the plurality of LU of the storage system include a LU with an attribute that is not provided to an upper-level computer, and since the LU with this attribute is not provided to the upper-level computer, this LU is not specified by an I/O command (for example, a write command or a read command) from the upper-level computer, but an I/O to this LU can occur in accordance with processing inside the storage system. In this case, if this LU is specified as a target for power savings by the administrator, one or more of the physical storage devices of this LU will be subjected to power savings despite the fact that a storage system internal I/O is being generated to this LU. When this happens, there is the risk that data will not be stored properly. It should be possible to avoid this kind of problem in accordance with the above-mentioned embodiment.

In one embodiment, for example, each of a plurality of physical storage devices is a disk device. The power-saving indication receiving section receives a spin-down indication from the management console, and the power-saving controller indicates a spin-down to one or more of the disk devices corresponding to the specified storage device. Further, the power-saving controller updates a spin-down count when indicating a spin-down to the respective disk devices, and when the post-update spin-down count exceeds a prescribed count threshold, the power-saving controller can send a warning to the management console. Further, instead of this, the power-saving controller can prohibit the use of a disk device that exceeds this spin-down count. More specifically, for example, the power-saving controller can block this disk device. Data is read out from one or more other disk devices inside the RAID group to which this blocked disk device belongs at this time, and either this read-out data itself, or data obtained by performing a prescribed operation using this read-out data can be stored in a spare disk device.

In one embodiment, for example, either an I/O system or a failure system can be employed as the above-mentioned prescribed logical unit attribute. A logical unit of the I/O system is one for which the frequency of I/O can be expected to be higher than that of a logical unit having a logical unit attribute other than this I/O system and failure system. Conversely, a logical unit of the failure system is one that corresponds to a logical unit in which a failure has been detected, or to a RAID group or disk device in which a failure has been detected.

For example, it is supposed that the storage system comprises a data copying section. The data copying section can form a logical unit pair, one side of which is a primary logical unit and the other side of which is a secondary logical unit, and can copy data from the primary logical unit to the above-mentioned secondary logical unit. It is supposed that when a logical unit pair has a first type pair status, this data copying section does not update the secondary logical unit even when there is an update to the primary logical unit, and when the logical unit pair has a second type pair status, this data copying section updates the secondary logical unit. In this case, the above-described I/O system logical unit can be used as at least a secondary logical unit of a logical unit pair having the second type pair status.

Further, for example, it is supposed that the storage system further comprises a cache memory area for temporarily storing data that is the target of an I/O conforming to an I/O command from a host computer. Data in the cache memory area can include clean data which is data that is stored in a plurality of physical storage devices, and dirty data which is data that is not stored in a plurality of physical storage devices. When there is both a failure to write dirty data in the cache memory area to one or more physical storage devices corresponding to a logical unit constituting the write destination of this dirty data, and an error in this physical storage device, data is not stored in this physical storage device. At this point, a logical unit corresponding to the physical storage device that has this error, or a logical unit corresponding to the RAID group of this physical storage device can be employed as the above-described failure system logical unit, making it possible not to use the logical unit of this dirty data write destination when the writing of the dirty data in the cache memory area fails.

In one embodiment, the above-described power-saving controller is capable of operating so as not to save on power to one or more physical storage devices corresponding to a specified storage device while a predetermined process is being executed, even when an identified logical unit attribute is not the prescribed logical unit attribute.

In one embodiment, when the above-mentioned identified logical unit attribute is not the prescribed logical unit attribute, the power-saving controller can execute I/O monitoring which is monitoring to determine whether or not an I/O command that specifies a logical unit corresponding to a specified storage device, is received from a host computer within a fixed period of time, and when such an I/O command is received within this fixed period of time, the power-saving controller can operate so as not to save on power to one or more physical storage devices corresponding to a specified storage device. Further, for example, the power-saving controller determines if I/O or power saving takes priority, and if I/O has priority, executes I/O monitoring, and if power saving has priority, can either execute an I/O hold process, in which even when an I/O command specifying a logical unit corresponding to a specified storage device is received, the I/O command is not processed, or can execute processing to send to either a host computer or the management console an unmount indication for unmounting a logical unit corresponding to a specified storage device in the host computer. Further, for example, when two or more logical units of a plurality of logical units are provided virtually to a host computer as a single logical unit, the power-saving controller can execute the above-mentioned I/O monitoring for another logical unit that constitutes an integrated logical unit when a logical unit corresponding to the above-mentioned specified storage device is a logical unit making up this integrated logical unit which is this single virtual logical unit.

In one embodiment, when a failure is detected in a physical storage device of a certain RAID group of a plurality of RAID groups, the power-saving controller can cancel power-saving to another physical storage device which belongs to this certain RAID group, and which is undergoing power-saving, execute recovery processing for this failure, and thereafter, automatically subject this other physical storage device to power-saving once again. "Canceling power-saving", for example, is indicating the cancellation of power-saving (for example, a power ON or spin-up, which will be explained hereinbelow) to a physical storage device.

In one embodiment, the storage system can further comprise an I/O controller for processing an I/O command received from a host computer. If one or more physical storage devices corresponding to a logical unit specified by a received I/O command are undergoing power-saving, the I/O controller can operate so as not to process this received I/O command. More specifically, for example, in response to this I/O command, the I/O controller can reply to the host computer with the below-described "Not Ready". Further, for example, even if one or more physical storage devices corresponding to a logical unit specified by a received I/O command is not undergoing power-saving, the I/O controller can also operate so as not to process this received I/O command if this logical unit is a component of an integrated logical unit, and one or more physical storage devices corresponding to another logical unit constituting this integrated logical unit are undergoing power-saving.

In one embodiment, based on the number of physical storage devices that are not undergoing power-saving in a prescribed range in the storage system, the power-saving controller can implement control so as to simultaneously cancel power-saving to a number of units of the plurality of physical storage devices that are undergoing power-saving in this prescribed range. Furthermore, the power-saving controller can control the number of units of physical storage devices for which power-saving is simultaneously cancelled, based on how many of the number of physical storage devices that are not undergoing power-saving are physical storage devices to which an I/O is generated. Furthermore, the prescribed range can be the entire storage system, a RAID group, or each of two or more enclosures comprising a plurality of physical storage devices. In this one embodiment, a physical storage device that is undergoing power-saving can be a physical storage device that is saving power in accordance with a power-saving indication from the management console, and, for example, can also be a physical storage device that is in a power-saving state by virtue of a physical storage device to which an I/O has not been generated in a fixed period of time being detected, and this detected physical storage device being subjected to power-saving. That is, in this one embodiment, respective physical storage devices can be subjected to power-saving via various methods.

In one embodiment, if the writing of dirty data in a cache memory area to one or more physical storage devices corresponding to a logical unit constituting the write destination of this dirty data, fails, the power-saving controller can subject the one or more physical storage devices to power-saving in a state, wherein this dirty data remains in the cache memory area.

In one embodiment, the storage system can comprise an event execution controller. The event execution controller can control the execution of an event generated by the storage system in accordance with whether or not a physical storage device related to this event is undergoing power-saving.

In one embodiment, the management console can comprise an information acquisition section for acquiring information denoting which physical storage devices in the storage system are undergoing power-saving; and an indication section which receives an administrator-desired indication, and performs the received indication relative to the storage system. The indication section, upon receiving an administrator-desired indication, can determine, by referencing the above-mentioned acquisitioned information, whether or not an I/O is to be generated to a physical storage device that is undergoing power-saving if processing conforming to the received indication is executed, and if it determines that an I/O is to be generated, can deny the storage system from performing this received indication.

The above-mentioned respective sections can also be read as means. The above-mentioned respective sections can be realized via hardware (for example, a circuit), a computer program, or a combination thereof (for example, either one or a plurality of CPUs that read and execute a computer program). The respective computer programs can be read in from a storage resource (for example, a memory) provided in a computer machine. These computer programs can also be installed in this storage resource via a CD-ROM, DVD (Digital Versatile Disk) or other such recording medium, and can also be downloaded via the Internet, a LAN or some other such communication network.

Figures 24A, 24B:
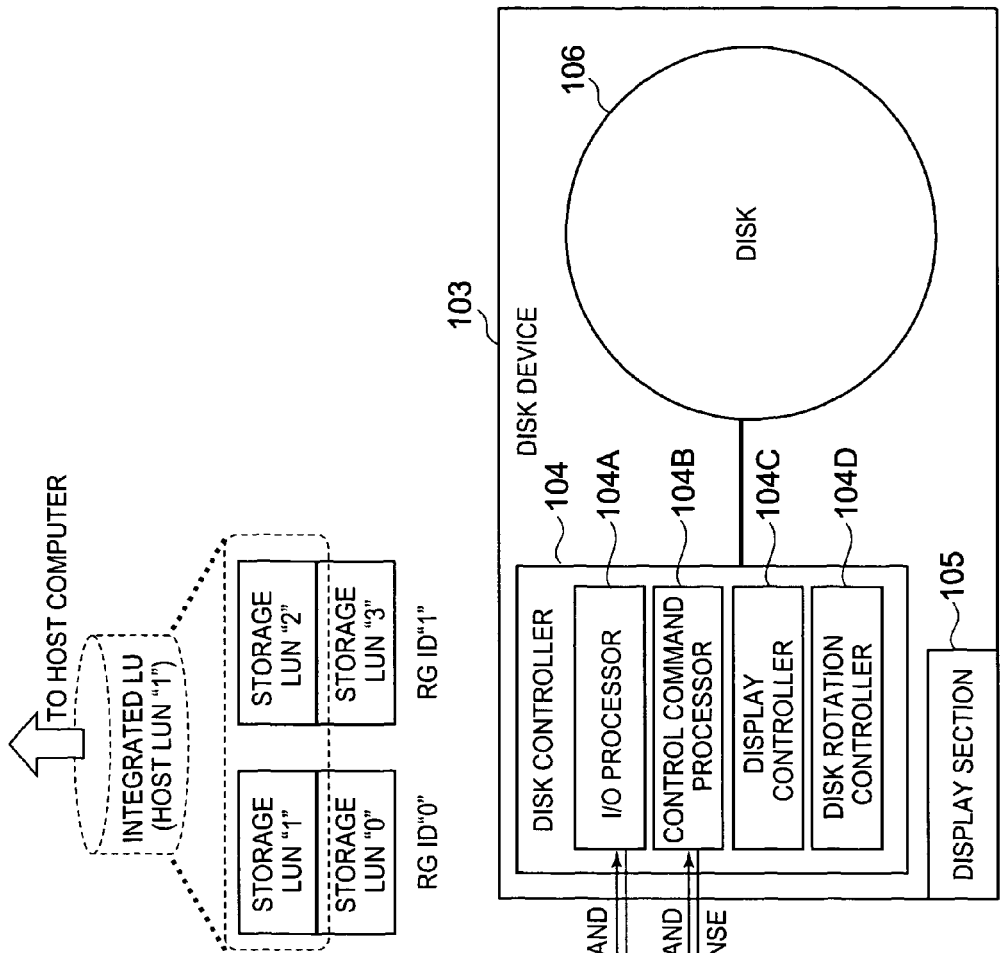
FIG. 24A shows a block diagram of an integrated LU.
FIG. 24B shows a block diagram of a disk device.

Incidentally, in the respective embodiments, which will be described in detail, a disk device of the constitution given as an example in FIG. 24B, for example, can be employed as the disk device. This disk device 103, for example, comprises a display section (for example, an LED (Light Emitting Diode) 105; a disk 106; and a disk controller 104. A variety of disks, such as a hard disk or DVD (Digital Versatile Disk) can be employed as the disk 106. Therefore, various devices, such as a hard disk drive (HDD) or DVD drive can be employed as the disk device 103. In this embodiment, it is supposed that the disk device 103 is a HDD. A variety of HDD, for example, a HDD having a SATA (Serial Attached SCSI) or FC (Fibre Channel) I/F can be employed as the HDD. It can be assumed that this disk device 103 is the same as the disk devices 103A and 103B, which will be described hereinbelow.

The disk controller 104, for example, comprises an I/O processor 104A, which performs data I/O to a disk 106 in accordance with an I/O command from outside; a control command processor 140B, which receives and responds to a type of control command that differs from an I/O command (for example, a spin indication command, Inquiry command, or SES (SCSI Enclosure Services) command, which will be described hereinbelow); a display controller 140C, which controls the display of the display section 105; and a disk rotation controller 104D, which controls the rotation of the disk 106. The respective sections 104A through 104D can be realized using hardware circuits, computer programs, or a combination thereof. The display controller 104C can perform a display in a mode (for example, a blinking LED pattern) that differs in accordance with whether this disk device 103 is spin-up or spin-down.

"Spin-up" is a state, wherein the disk 106 inside the disk device 103 is rotating at high speed. Hereinafter, causing the disk 106 to rotate at high speed will be called "spin up". Further, "spin-down" is a state, wherein the rotation of the disk 106 inside the disk device 103 is stopped (but it is not limited to this, and can also refer to rotating the disk 106 at a lower speed than at a spin-up). Hereinafter, stopping the rotation of the disk 106 will be called "spin down". In a spin-down, only the control command processor 104B in the disk controller 104 has to operate; the other sections 104A, 104C and 104D do not have to operate. For example, if the power source for the control command processor 104B is separate from the power source of the other sections 104A, 104C and 104D, control can be implemented such that the power source of these other sections is turned OFF, and only the power source of the control command processor 104B is turned ON. Furthermore, if this is done, the power source of the display controller 104C is turned OFF, with the result that nothing is displayed in the display section 105, and if it is supposed that nothing being displayed on the display section 105 signifies a spin-down, if will be possible for a person looking at the display section 105 to determine if this disk device 103 is in a spin-up or a spin-down.

The control command processor 104B can receive, interpret and process a spin indication command from the outside. For example, if a spin-up is specified by a spin indication command, the control command processor 104B has the disk rotation controller 104D spin up the disk 106, and has the display controller 104C execute a display corresponding to a spin-up. Conversely, if a spin-down is specified by a spin indication command, the control command processor 104B has the disk rotation controller 104D spin down the disk 106, and has the display controller 104C execute a display corresponding to a spin-down. The control command processor 104B can also turn OFF the power to the I/O processor 104A, the display controller 104C and the disk rotation controller 104D at this time.

Another type of physical storage device can be employed instead of a disk device 103. In this case, for example, the storage medium in the physical storage device is equivalent to the disk 106, and an interface section from outside this physical storage device to this storage medium is equivalent to the disk controller 104.

A number of embodiments will be explained in detail below. Furthermore, in the following embodiments, for example, powering OFF of a disk device can be used instead of a spin-down, and powering ON of a disk device can be used instead of a spin-up. If powering OFF is used, it should be possible to curtail power consumption more than in a spin-down, and the above-mentioned spin-up diagnostic can be applied in this case as well. Conversely, using a spin-down instead of powering OFF enables a state, wherein a prescribed type of command is received and a response returned while realizing power-saving. In other words, it becomes possible to realize both power-saving and a spin-down diagnostic, which will be explained hereinbelow.

First Embodiment

FIG. 1 shows an example of the external appearance of a storage system related to a first embodiment of the present invention.

The storage system 100 has a plurality of enclosures. The plurality of enclosures, for example, constitute one main enclosure 101A, and one or more expansion enclosures 101B. The one or more expansion enclosures 101B can all be directly connected to the one main enclosure 101A, or the main enclosure 101A can be the uppermost stream, and the one or more expansion enclosures 101B can be linked cascadingly. Hereinafter, with regard to the respective components of the main enclosure 101A and an expansion enclosure 101B, the same type components will be assigned the same number (for example, 111) and a different letter (for example, A, B).

The main enclosure 101A and expansion enclosure 101B will be explained using the main enclosure 101A as an example. Thereafter, the expansion enclosure 101B will be explained mainly in terms of the points of difference with the main enclosure 101A.

For example, a main controller 107, and a plurality of fans 111A are mounted in the main enclosure 101A. Further, a plurality of disk devices 103A are inserted in the main enclosure 101A. An LED (Light Emitting Diode) 105A is mounted in each disk device 103A. More specifically, for example, the disk device 103a is inserted back-side-first into the main enclosure 101a, and the LED 105A is on the front side of the disk device 103A. The blinking pattern of the LED 105A is controlled in accordance with the power-saving status of the disk device 103A (described in more detail below). This enables a person looking at the main enclosure 101A from the front to discern the power-saving status of a disk device 103A.

A sub-controller 111 is mounted in an expansion enclosure 101B instead of a main controller 107. Further, the number of disk devices 103B capable of being mounted in an expansion enclosure 101B can be greater than the number of disk devices 103A capable of being mounted in the main enclosure 101A (Of course, this number can be the same or less as well.)

FIG. 2A shows a block diagram of an entire system related to the first embodiment of the present invention.

A host computer 121 is connected to the main enclosure 101A of the storage system 100 via a communication network (for example, a SAN (Storage Area Network)) or a leased line. The main enclosure 101A is connected to a management console 171 via a communication network (for example, a LAN (Local Area Network)) or a leased line.

The host computer 121 sends an I/O command to the storage system 100. An I/O command, for example, is a write command or a read command. In an I/O command, for example, a LUN (Logical unit Number) and LBA (Logical Block Address) are specified as the I/O destination. Here, the specified LUN is a host LUN, which will be explained hereinbelow.

The management console 171 is a kind of computer, and, for example, comprises a display device 175; an input device (for example, a keyboard or mouse) 179; a memory 177; a CPU 173; and a communication interface device (an interface device for communicating with the storage system 100) 181. The management console 171 can be constituted from a plurality of computers. For example, the memory 177 and CPU 173 can be a server, and the display device 175 and input device 179 can be a client. Of one or more host computers 121 and the storage system 100, the management console 171 can manage at least the one or more host computers 121.

The storage system 100 can comprise at least one of a function for executing data copying between LUs (Logical units) (a function for changing the pair status of a LU pair in a timely fashion at that time); a function for executing data migration between LU; a function for operating as a NAS (Network Attached Storage); and a function for formatting a LU.

The main controller 107 of the main enclosure 101A, for example, comprises an interface device for communicating with a host computer 121 (for example, a communication port, hereinafter called a host I/F) 132; an interface device for communicating with the management console 171 (for example, a communication port, hereinafter called a management I/F) 139; an interface device for communicating with a disk device 103A (for example, a communication port, hereinafter called a disk I/F) 136A; a CPU 133; a memory 134; a timer 391A; a transmission control circuit 141A; and an inter-enclosure I/F 143A. The host I/F 132, management I/F 139, inter-enclosure I/F 143A, memory 134, disk I/F 136A and CPU 133 are connected to the transmission control circuit 141A, and communications between these components and the other components is performed via the transmission control circuit 141A. A plurality of disk devices 103A are connected to the disk I/F 136A.

The sub-controller 111 of an expansion enclosure 101B can be a simpler constitution than the main controller 107. A transmission control circuit 141B, disk I/F 136B and inter-enclosure I/F 143B are connected to the sub-controller 111.

The inter-enclosure I/F 143A and inter-enclosure I/F 143B are interconnected, and are each duplexed. If a failure should occur in one of either inter-enclosure I/F 143A or 143B when the main controller 107 is performing an I/O to a certain disk device 103B in response to an I/O command from a host computer 121, the main controller 107 can perform the I/O to this certain disk device 103B via the other inter-enclosure I/Fs 143A and 143B.

As shown in FIG. 2B, a RAID group is constituted from two or more disk devices of a plurality of disk devices 103A and 103B. The RAID group is a group constituting a RAID (Redundant Array of Independent (or Inexpensive) Disks). The RAID group can be constituted from only disk devices inside the same enclosure, or can be a mixture of disk devices inside different enclosures. An LU can be provided by partitioning the storage space provided by the RAID group. An LU can span all the disk devices constituting the RAID group, or it can be provided by a single disk device.

Figure 3B:
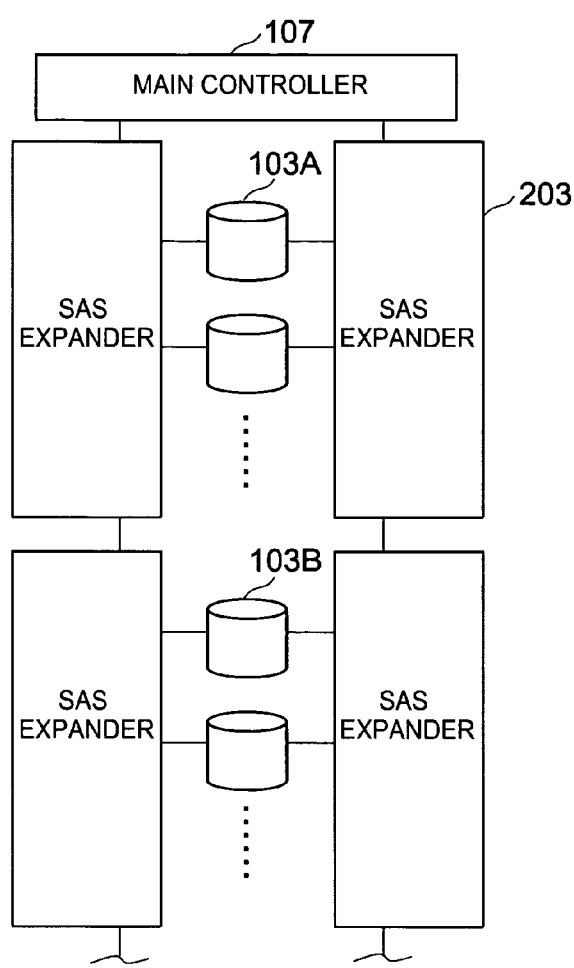
FIG. 3B shows an example in which the respective disk devices 103A and 103B are connected via an SAS expander 203 to the main controller 107.

The preceding is an example of the constitution of the overall system. The above-described constitution is only one example, and the present invention does not have to be limited to the constitution described hereinabove. For example, the above-described constitutions of the main controller 107 and sub-controller 111 are examples, and other constitutions can also be employed. Further, the connection of the respective disk devices 103A, 103B to the main controller 107, for example, can be through a FC-AL (Fibre Channel Arbitrated Loop) 201 as shown in the example of FIG. 3A, or can be through a SAS (Serial Attached SCSI) expander 203 as shown in the example of FIG. 3B.

Figure 4B:
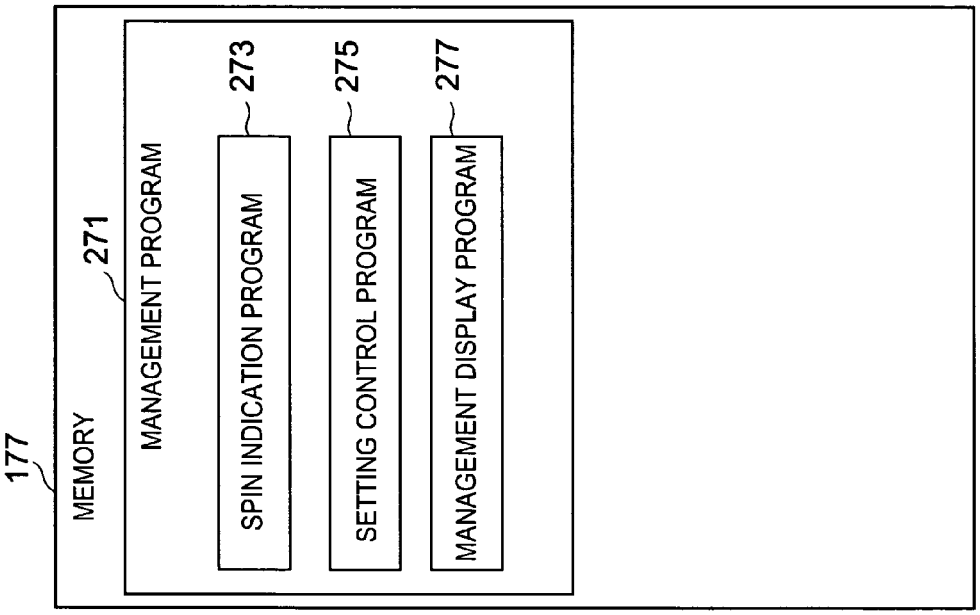
FIG. 4B is a schematic diagram of the computer programs stored in a memory 177 of a management console 171.
Figure 4A:
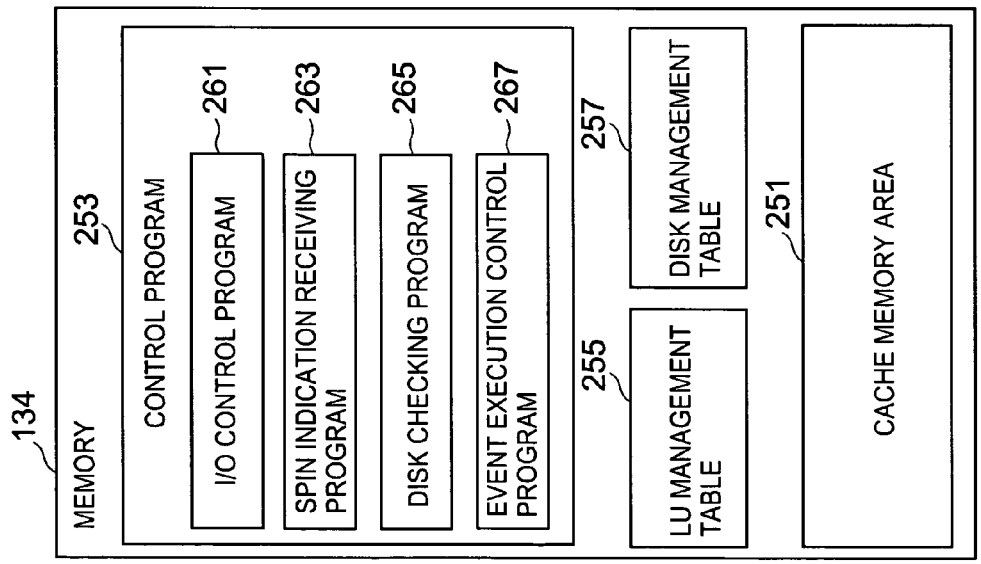
FIG. 4A is a schematic diagram of an area prepared in a memory 134 of the main controller 107, as well as the information and computer programs stored in the memory 134.

FIG. 4A is a schematic diagram of an area provided in the memory 134 of the main controller 107, as well as the information and computer programs stored therein.

The area provided in the memory 134, for example, is a cache memory area 251. The cache memory area 251 temporarily stores, in accordance with an I/O control program 261, I/O-targeted data (data to be written to disk device 103A and/or disk device 103B, or data to be read from disk device 103A and/or disk device 103B), which conforms to an I/O command from a host computer 121.

Information stored in the memory 134, for example, includes an LU management table 255 and a disk management table 257. A detailed explanation of these tables 255 and 257 will be provided below.

The computer programs, which are stored in the memory 134 and executed by the CPU 133, are programs for controlling the main controller 107 (hereinafter, control program) 253. Hereinafter, it is supposed that when a computer program is the subject, processing is actually being performed by the CPU, which executes this computer program. The control program 253, for example, comprises an I/O control program 261 for controlling the processing of an I/O command from a host computer 121; a spin indication receiving program 263 for receiving a spin indication from the management console 171, and performing spin control in response to this spin indication; a disk checking program 265 for checking the respective disk devices 103A and 103B; and an event execution control program 267 for controlling whether or not to permit the execution of a generated event (an event will be explained in detail below) based on the power-saving status. The processing performed by the respective computer programs 261, 263, 265 and 267 will be explained in detail hereinbelow.

FIG. 4B is a schematic diagram of the computer programs stored in a memory 177 of the management console 171.

The computer programs, which are stored in the memory 177 and executed by the CPU 173, are programs for controlling system management via the management console 171 (hereinafter, management program) 271. The management program 271 comprises a spin indication program 273 for receiving a storage device specification from an administrator, and sending to the storage system 100 a spin indication comprising the storage device specification; a setting control program 275 for controlling whether or not to permit settings to the storage system 100 by an administrator based on the power-saving status; and a management display program 277 for displaying information that is being managed. The management display program 277, for example, can acquire from the storage system 100 the LU management table 255 and disk management table 257, and display the acquired tables 255 and 257 on the display device 178 as-is or edited (For example, it can display the spin-down count, which will be explained hereinbelow, as trace information). The processing performed by the other computer programs 273 and 275 will be explained in detail below.

FIG. 5 shows a block diagram of the LU management table 255.

The LU management table 255 is a table for managing the respective LU in the storage system 100. In the LU management table 255, a RG ID, storage LUN, host LUN, LUN attribute, power-saving status, I/O response status, normal dirty data information and failure dirty data information for a single LU (this single LU is referred to as the "target LU" in the explanation of this figure) are made correspondent.

The RG ID is the identifier of the RAID group to which the target LU belongs.

The storage LUN is the LUN (Logical unit Number) of the target LU, and is a type of LUN, which is recognized inside the storage system 100, and which differs from the host LUN.

The host LUN is the target-LU LUN that is specified by a host computer 121. In other words, the host LUN is a LUN, which is recognized by a host computer 121. By contrast, the above-described storage LUN is a LUN that is not subject to specification by a host computer 121.

The LU attribute is the attribute related to the target LU. The LU attribute can also be called the LU type. In this embodiment, LU attributes can be broadly divided into the three attributes of normal, I/O and failure. Each of these LU attributes will be explained in detail hereinbelow.

The power-saving status is the status related to saving power to a disk device of the target LU. The power-saving status comprises a plurality of types of statuses. For example, there are five types of power-saving statuses: spin-up, I/O monitoring, spin-down processing, spin-down, and spin-up processing. The power-saving status "spin-up" signifies a state, wherein a disk device of the target LU spins up, in other words, a state in which power-saving is canceled. The power-saving status "I/O monitoring" signifies a state, wherein monitoring is performed to determine if an I/O command specifying the target LU has been received, in other words, a state in which it has been tentatively determined to spin down a disk device of the target LU (a state, wherein, if an I/O command is received during monitoring, this decision is canceled). The power-saving status "spin-down processing" signifies a state that exists from the time a formal determination to spin down a disk device of the target LU is made until spin-down occurs. The power-saving status "spin-down" signifies that a disk device of the target LU is in the spin-down state. The power-saving status "spin-up processing" signifies a state that exists from the time a formal determination to spin up a disk device of the target LU is made until spin-up occurs. The target LU covers two or more disk devices, and when these two or more disk devices have respectively different power-saving statuses, all of these power-saving statuses can be written as the power-saving status of the target LU, or a power-saving status that has been arbitrarily selected by the control program 253 can be written.

The I/O response status is a value signifying how to respond to a host computer 121 when the target LU is specified in an I/O command from the host computer 121. The I/O response status comprises a plurality of types of statuses. For example, there are two types of I/O response statuses: normal and Not Ready. The I/O response status "normal" is a status signifying that upon receiving an I/O command, the I/O control program 261 will process this I/O command normally (for example, if this processing is successful, OK is returned to the host computer 121, and if this processing is not successful, NG is returned to the host computer 121). Conversely, the I/O response status "Not Ready" is a status signifying that, upon receiving an I/O command, a value called "Not Ready" will be returned to the host computer 121 without the I/O control program 261 processing this I/O command. When a "Not Ready" value is received as an I/O command return value, the host computer 121 can recognize that the LU corresponding to the host LUN specified by this I/O command is not ready.

Normal dirty data information is information related to normal dirty data that should be written to the target LU. This information, for example, comprises an address denoting where the normal dirty data is in the cache memory area 251, and the data size of this normal dirty data. Furthermore, normal dirty data is data (dirty data), which is stored in the cache memory area 251, and which has not yet been written to a disk device, and is dirty data that is not failure dirty data. The opposite of dirty data, for example, is clean data, which is data that has been stored in the target LU.

Failure dirty data information is information related to failure dirty data that should be written to the target LU. This information, for example, comprises an address denoting where the failure dirty data is in the cache memory area 251, and the data size of this failure dirty data. Furthermore, failure dirty data is dirty data, which failed for some reason to be written to a disk device of the target LU, and which has yet to be written to this disk device.

The preceding is an explanation of the LU management table 255.

In this table 255, a plurality of storage LUNs "1", "2" that belong to different RAID groups "0", "1" correspond to a single host LUN "1". This is conceptualized in FIG. 24A. Correspondence like this makes it possible for a host computer 121 to see a single LU corresponding to the host LUN "1", but enables the storage system 100 to recognize a plurality of LU constituting this single LU. In this embodiment, a plurality of LU can be virtually treated as a single LU like this, and this single LU is called an "integrated LU".

FIG. 6 shows a block diagram of the disk management table 257.

The disk management table 257 is a table for managing the respective disk devices 103A, 103B that are in the storage system 100. In the disk management table 257, an RG ID, disk ID, storage LU range, power-saving status, spin-down count, next check start address, and last check end time for a single disk device (this single disk device is referred to as the "target disk device" in the explanation of this figure) are made correspondent.

The RG ID is the identifier of the RAID group to which the target disk device belongs. Furthermore, the fact that "spare" is written in the RG ID column means there is a reserve disk device (hereinafter, spare disk device). The spare disk device, for example, is treated as a data write destination when data cannot be read out from a certain disk device of a certain RAID group (A detailed explanation will be given hereinbelow). The spare disk device management method is not limited to the method shown in the figure, and another method, for example, one in which a dedicated table for managing a spare disk device is prepared, and the spare disk device is managed by this table can be used.

The disk ID is the target disk device identifier. This identifier is constituted by combining the enclosure number and the disk device number. Therefore, from this identifier, it is possible to determine the disk device, and the enclosure that this disk device is in. Furthermore, the present invention is not limited to this, and the enclosure number and disk device number can also be in separate columns.

The storage LU range is information denoting the LU range to which the target disk device belongs. This information, for example, can be expressed by combining the storage LUN (the figure in front of the parentheses in FIG. 6) and the address range in a LU corresponding to the storage LUN (the figures in parentheses in FIG. 6).

The power-saving status is a status related to saving on power to the target disk device. The power-saving status comprises the plurality of types of statuses described hereinabove.

The spin-down count is the number of times that a spin-down is performed for the target disk device, in other words, the number of times that the rotation of a disk rotating at high speed is stopped.

The next check start address is the address of a disk in the target disk device, and signifies the location where a check is performed by error checking in a spin-up diagnostic, which will be explained hereinbelow.

The last check end time denotes the time at which the previous spin-up diagnostic was completed for the target disk device.

The flow of processing performed in this embodiment will be explained below. Furthermore, a step will be abbreviated as "S" in the following explanations.

FIG. 7 shows an example of the overall flow of processing related to a spin-down indication and execution.

In S101, the spin indication program 273 displays a graphical user interface (GUI) on the display device 175 of the management console 171 in accordance with an operation by an administrator. This GUI, for example, is constituted so as to be able to receive a spin-down indication in a unit of at least one of a RAID group, LU or disk device. More specifically, for example, this GUI is able to receive at least one indication from among a RG ID, storage LUN and disk ID. An administrator can use the input device 179 to specify at least one of a desired RG ID, storage LUN or disk ID, and to indicate a spin-down.

In S102, the spin indication program 273 receives a specification for an administrator-desired storage device (at least one of a RAID group, LU or disk device) and a spin-down indication via this GUI.

In S103, upon receiving a spin-down indication from an administrator, the spin indication program 273 prepares a spin-down indication (command), which specifies the administrator-desired storage device, and sends this spin-down indication to the storage system 100. Thereafter, the spin indication program 273 transitions to a state in which it waits for a response from the storage system 100 (S104).

In S105, the spin indication receiving program 263 in the storage system 100 receives the spin-down indication from the management console 171.

In S106, the spin indication receiving program 263 determines the LU attribute of the LU corresponding to the storage device specified in this spin-down indication (hereinafter, called the "spin-down target LU"), and whether or not the current state inside the storage system 100 meets the spin-down conditions. The spin-down conditions here are that the LU attribute of the spin-down target LU is not a prescribed LU attribute, and that a prescribed process affiliated with the prohibition of a spin-down is not being executed inside the storage system 100. If the determination result is that spin-down conditions are being met, processing proceeds to S107, and if the determination result is that spin-down conditions are not being met, processing proceeds to S110.

In S107, the spin indication receiving program 263, using the timer 391A, monitors whether or not an I/O command specifying the spin-down target LU is received within a fixed period of time. If the reception of this I/O command is detected within the fixed period of time, processing proceeds to S110, and if the reception of this I/O command is not detected, processing proceeds to S108.

In S108, the spin indication receiving program 263 executes a destaging process. That is, the spin indication receiving program 263 writes the dirty data in the cache memory area 251 corresponding to the spin-down target LU to one or more disk devices of this spin-down target LU.

In S109, the spin indication receiving program 263 executes spin-down for the one or more disk devices of the spin-down target LU.

In S110, the spin indication receiving program 263 decides to deny the spin-down of the disk device of the storage device specified in the spin-down indication. Furthermore, in this S110, for example, if the respective power-saving statuses of the spin-down target LU and the disk device of the spin-down target LU are "I/O monitoring" in the processing of S107, this power-saving status is returned to "spin-up".

In S111, the spin indication receiving program 263 sends data denoting the results of the spin-down indication from the management console 171 (indication results data) to the management console 171.

In S112, the spin indication program 273 in the management console 171 receives the indication results data.

In S113, the spin indication program 273 displays the indication results denoted by this indication results data on the display device 175.

The preceding is one example of the overall flow of processing related to spin-down indication and execution.

This processing makes it possible to spin down a disk device of an administrator-desired storage device. Further, since a spin-down indication is denied from the management console if spin-down conditions are not being met at that time, adverse affects can be prevented from occurring in the storage system 100.

Further, according to this processing, when there are a plurality of host computers, the fact that an administrator issues a power-saving indication from the management console makes it possible for this plurality of host computers (and the application programs executed by the respective host computers) to work in concert. In other words, for example, when a plurality of host computers (or applications) share a RAID group, if the respective host computers (or applications) are able to issue power-saving indications independently, this could give rise to the problem of one host computer executing power saving despite the fact that another host computer has generated an I/O; however, issuing a power-saving indication from the management console makes it possible to avoid such a problem.

Now then, the respective steps of the overall processing flow described above will be explained in detail hereinbelow.

FIG. 8A is an example of a first GUI displayed in S101 of FIG. 7. FIG. 8B is an example of a second GUI displayed in S101 of FIG. 7.

The first GUI is a GUI for receiving a specification in a RAID group unit or a LU unit, and a spin-down or spin-up indication. The second GUI is a GUI for receiving a specification in a RAID group unit or a disk device unit, and a spin-down or spin-up indication. In the first GUI, checkboxes are displayed together with RG IDs and storage LUNs, and in the second GUI, checkboxes are displayed together with RG IDs and disk IDs. When a check mark is entered into a checkbox of a desired RG ID, storage LUN or disk ID, and thereafter, the spin-down execution button is pressed, the spin indication program 273 can generate and send a spin-down indication (a spin-up indication when the spin-up execution button is pressed), which specifies the RG ID, storage LUN or disk ID for which this check mark was entered.

The spin indication program 273 can acquire the LU management table 255 and the disk management table 257 from the storage system 100, and on the basis of these acquired tables 255 and 257, can prepare and display the above-mentioned first and second GUIs. Either all or a part of the information recorded in the respective tables 255 and 257 can be displayed in the respective GUIs. The first GUI and second GUI can be switched when an administrator presses a screen switching button provided on the respective GUIs, and the first GUI and second GUI can also be displayed side-by-side or overlapping one another on the display device 175.

A GUI displayed by the spin indication program 273 is not limited to the examples shown in the figures, and another constitution can be employed. Further, an administrator-desired storage device can be specified, and a spin-down or spin-up can be specified using a method that differs from the GUI utilization method.

FIG. 9 shows an example of the detailed flow of processing executed in S106 of FIG. 7.

In S106A, the spin indication receiving program 263 determines whether or not processing affiliated with the prohibition of a spin-down (hereinafter, spin-down prohibition-related processing) is in progress inside the storage system 100. Here, spin-down prohibition-related processing, for example, includes the replacement of a computer program executed by the CPU 133, and the replacement of firmware inside a disk device of a spin-down targeted LU. When a determination is made in this S106A that a spin-down prohibition-related process is in progress, S106A is YES, that is, S106 of FIG. 7 is NO, and when it is determined that a spin-down prohibition-related process is not in progress, S106A is NO, and processing proceeds to S106B.

In S106B, the spin indication receiving program 263 determines if the unit specified in a spin-down indication, in other words, if the specified storage device is a RAID group, LU or disk device. When the specified storage device is determined to be a RAID group, processing proceeds to S106C, when it is determined to be an LU, processing proceeds to S106D, and when it is determined to be a disk device, processing proceeds to S106E.

In S106C, the spin indication receiving program 263 identifies one or more LU (spin-down target LU) of the specified one or more RAID groups, and the respective LU attributes of this one or more LU by referencing LU management table 255, and determines whether or not at least one of the identified one or more LU attributes is the LU attribute "I/O" or "failure". When the determination is affirmative, S106C is YES, that is, S106 of FIG. 7 is NO, and when the determination is negative, S106C is NO, that is, S106 of FIG. 7 is YES.

In S106D, the spin indication receiving program 263 identifies the respective LU attributes of the specified one or more LU (spin-down target LU) by referencing LU management table 255, and determines whether or not at least one of the identified one or more LU attributes is the LU attribute "I/O" or "failure". When the determination is affirmative, S106D is YES, that is, S106 of FIG. 7 is NO, and when the determination is negative, S106D is NO, that is, S106 of FIG. 7 is YES.

In S106E, the spin indication receiving program 263 identifies one or more LU (spin-down target LU) of the specified one or more disk devices, and the respective LU attributes of this one or more LU by referencing LU management table 255, and determines whether or not at least one of the identified one or more LU attributes is the LU attribute "I/O" or "failure". When the determination is affirmative, S106E is YES, that is, S106 of FIG. 7 is NO, and when the determination is negative, S106E is NO, that is, S106 of FIG. 7 is YES.

Here, an LU of LU attribute "I/O" is an LU in which the storage system can expect an I/O to be issued to a disk device. Conversely, an LU of the LU attribute "failure" is an LU of a storage device (a RAID group, LU or disk device) in which a failure has been detected. Concrete examples of the respective LU attributes "I/O" and "failure" are disclosed in the table of FIG. 25.

A number of the plurality of concrete examples disclosed in the table of FIG. 25 will be given as examples and explained.

In this storage system 100, for example, an LU pair is formed, one of the two LU constituting the LU pair is made the primary LU, and the other is made the secondary LU, and data copying is performed from the primary LU to the secondary LU. To accomplish this, for example, a computer program dedicated to data copying, called a copying control program (not shown in the figure), can be included in the control program 253, or the I/O control program can comprise this data copying function. If the secondary LU is inside the same storage system as the primary LU, data copying becomes so-called local copying, and if the secondary LU is inside a different storage system than the primary LU, data copying becomes so-called remote copying. There are a plurality of types of statuses for an LU pair, and these plurality of types of statuses can be broadly divided into three types: do not update secondary LU, update secondary LU, and failure. The storage system 100 (for example, the above-mentioned copying control program) can update the status of a LU pair on a timely basis. The respective LU (at least, for example, the secondary LU) of a LU pair having a pair status, which updates the secondary LU, can be treated as an LU of LU attribute "I/O". Furthermore, the update secondary LU pair status, for example, includes "synchronized" (a state, wherein if there is an update to a primary LU, the secondary LU is updated with the same update at substantially the same timing) and "updating in progress" (a state, wherein the data inside the primary LU is copied to the secondary LU). By contrast, the do not update secondary LU pair status, for example, comprises "split" (a state, wherein the secondary LU is not updated even when the primary LU undergoes updating). Generally speaking, since the secondary LU, unlike the primary LU, is not recognized by a host computer 121, measures for doing away with I/O to an LU by unmounting this LU are not possible. For this reason, it is considered useful to treat at least the secondary LU of the two LU, which constitute an LU pair of the update secondary LU pair status, as an LU of the LU attribute "I/O" as explained above.

For example, an LU comprising a blocked disk device can be treated as an LU of the I/O attribute "failure". Here, a "blocked disk device" signifies a disk device in a state, wherein a failure of some sort occurred rendering it incapable of operating normally. For example, in a RAID group of RAID level "RAID5", data, which is held in an LU having either all or part of the storage space provided by a blocked disk device, is in a non-redundant state, therefore making it necessary to restore the blocked disk device as soon as possible. In this case, making sure not to uniformly spin down one or more disk devices in a RAID group comprising a blocked disk device is considered effective from the standpoint of enhancing data protection reliability.

Further, for example, a write-incomplete LU can be treated as an LU of the I/O attribute "failure". "Write-incomplete" signifies a data block that has been lost due to a failure inside the storage system 100. Specifically, for example, when an attempt to recover a lost data block fails during correction copying, which will be explained hereinbelow, write-incomplete is generated. More specifically, for example, write-incomplete is generated when correction copying is performed because one disk device is blocked, but the data cannot be restored due to a media error in another disk device. Therefore, write-incomplete constitutes a state in which data does not exist. Thus, a write-incomplete LU is an LU that is in an unsound state. Making sure that spin-down is not performed across-the-board for one or more disk drives that belong to such an LU is considered to be effective from the standpoint of enhancing data protection reliability. Furthermore, in contrast to the write-incomplete LU, there is an LU that corresponds to failure dirty data. These two types of LU are alike in that data is not stored in a disk device. However, there is no way of being certain if a failure has occurred in the respective disk devices of a LU corresponding to failure dirty data. In this embodiment, the focus is on this point, and a write-incomplete LU is treated as an LU for which spin-down is not executed, but an LU corresponding to failure dirty data is treated as an LU for which spin-down is executed.

FIG. 10 shows an example of the detailed flow of processing executed in S107 of FIG. 7.

In S107A, if the determination in the above-mentioned S106B is that a specified storage device is a RAID group, processing proceeds to S107B, if it is an LU, processing proceeds to S107E, and if it is a disk device, processing proceeds to S107F.

In S107B, the spin indication receiving program 263 determines whether or not at least one LU of the specified RAID group is included in an integrated LU by referencing the LU management table 255. If an LU is included in an integrated LU, processing proceeds to S107D, and an LU is not included in an integrated LU, processing proceeds to S107C.

In S107C, the spin indication receiving program 263 commences monitoring for an I/O command in all of the LU of the specified RAID group (timing by the timer 391A also starts at this time). Further, power-saving status "I/O monitoring" is set in the respective tables 255 and 257 for all these LU, and for the disk devices that respectively belong to all these LU (S107G).

In S107D, the spin indication receiving program 263 commences monitoring for an I/O command in all of the LU of the specified RAID group and integrated LU (timing by the timer 391A also starts at this time). Further, S107G explained above is also executed.

In S107E, the spin indication receiving program 263 commences monitoring for an I/O command in a specified LU (timing by the timer 391A also starts at this time). Further, S107G explained above is also executed.

In S107F, the spin indication receiving program 263 commences monitoring for an I/O command in an LU of a specified disk device (timing by the timer 391A also starts at this time). Further, S107G explained above is also executed.

If an I/O command specifying a host LUN corresponding to a monitoring target LU is not received within a fixed period of time from the start of I/O monitoring, S107H is NO, that is, S107 of FIG. 7 is NO. Conversely, if such an I/O command is received, S107H is YES, that is, S107 of FIG. 7 is YES.

A desired storage device is specified by an administrator, but there is a likelihood of an incorrect specification being made at this time. For example, when the processing flow is such that an LU corresponding to a disk device slated for spin-down is unmounted in a host computer, and thereafter this disk device is subjected to spin-down, there is a possibility the disk device corresponding to the unmounted LU could mistakenly be specified as the target of spin-down. However, according to the processing flow, spin-down is not executed immediately after receipt of a spin-down indication, but rather I/O monitoring is executed for a fixed period of time (for example, one minute), and when the reception of an I/O command is detected, the spin-down indication is denied from the management console. This makes it possible to prevent an erroneous spin-down from being performed on the basis of an erroneous storage device specification.

FIG. 11 shows an example of the detailed flow of processing executed in S108 of FIG. 7.

In S108A, the spin indication receiving program 263 sets "spin-down processing" in the respective tables 255 and 257 as the power-saving statuses of the spin-down target LU and the disk device belonging thereto. Further, the spin indication receiving program 263 sets "Not Ready" in the LU management table 255 as the I/O response status corresponding to the spin-down target LU. When an integrated LU comprising the spin-down target LU exists at this time, the spin indication receiving program 263 also sets "Not Ready" in the LU management table 255 as the I/O response status for the other LU comprising this integrated LU. Accordingly, even if the power-saving status corresponding to this other LU is "spin-up", the I/O control program 261 sends "Not Ready" to the host computer 121 as the return value when an I/O command specifying this other LU is received from the host computer 121.

In S108B, the spin indication receiving program 263 determines if there is any normal dirty data corresponding to the spin-down target LU by referencing the LU management table 255. If such normal dirty data exists, S108B is YES, and processing proceeds to S108C, and if such normal dirty data does not exist, S108B is NO. That is, when dirty data corresponding to the spin-down target LU is failure dirty data, destaging is not performed. There is a high likelihood of destaging failing for failure dirty data, and repeatedly attempting destaging numerous times for this type data will probably unnecessarily increase the load, but destaging is not performed for failure dirty data here. Accordingly, the useless increase of load can be held in check. Furthermore, for example, since attempting destaging one or more times could enable writing, destaging can be attempted a prescribed number of times, and if these attempts all result in failure, then the result for S108B can be NO. Further, in this S108B, instead of determining if there is any normal dirty data, a determination can be made as to the presence or absence of dirty data. In this case, destaging can be performed even for failure dirty data.

In S108C, the spin indication receiving program 263 identifies where normal dirty data is located in the cache memory area 251 based on normal dirty data information corresponding to the spin-down target LU, reads the normal dirty data from the identified location, and writes the read-out normal dirty data to one or more disk devices of the spin-down target LU (that is, performs destaging). If destaging succeeds (for example, if OK is returned from the disk device), S108D is YES, and if destaging fails, S108D is NO, and processing proceeds to S108E.

In S108E, the spin indication receiving program 263 increments the number of destaging attempts by 1. If the number of destaging attempts subsequent to incrementing constitutes a prescribed threshold value, S108F is YES, and processing proceeds to S108G, and if the post-increment number of attempts does not reach the prescribed threshold value, S108 is NO, processing returns to S108C, and destaging is executed once again.

In S108G, the spin indication receiving program 263 manages normal dirty data as failure dirty data. More specifically, for example, the spin indication receiving program 263 updates the normal dirty data information of the spin-down target LU to failure dirty data information.

FIG. 12 shows an example of the detailed flow of processing executed in S109 of FIG. 7.

In S109A, the spin indication receiving program 263 sends a spin-down indication command to a disk device of the spin-down target LU (hereinafter, the target disk device). This indication command is received by the control command processor 104B in the disk device 103 explained by referring to FIG. 24B. The control command processor 104B causes the disk rotation controller 104D to spin down the disk 106 in accordance with the spin-down indication command, causes the LED 105 to execute a blinking pattern display corresponding to spin-down, and when spin-down ends, responds with spin-down-end to the spin indication receiving program 263.

In S109B, the spin indication receiving program 263 sets "spin-down" in the disk management table 257 as the power-saving status for the target disk device that responded with spin-down-end. Further, if spin-down-end has been returned for at least one or all of the one or more target disk devices of the spin-down target LU, the spin indication receiving program 263 can set "spin-down" in the LU management table 255 as the power-saving status for this spin-down target LU.

In S109C, the spin indication receiving program 263 prepares indication results data. The indication results data prepared in this S109C is data denoting as an indication result the fact that spin-down was successful for all disk devices of the administrator-desired storage device.

In S109D, the spin indication receiving program 263 increments by 1 the spin-down count (the spin-down count recorded in the disk management table 257) corresponding to the respective target disk devices.

In S109E, the spin indication receiving program 263 determines whether or not the post-increment spin-down count exceeds a count threshold. If a disk device for which this spin-down count exceeds the count threshold exists, the spin indication receiving program 263 incorporates warning information into the above-mentioned prepared indication results data. Warning information is information related to a warning that there exists a disk device for which the spin-down count exceeds the prescribed count threshold, and, more specifically, for example, is information comprising the disk ID of this target disk device, and a storage LUN and RG ID corresponding to this disk ID. Indication results data comprising this warning information is sent to the management console 171, and displayed by the spin indication program 273, thereby enabling the administrator to learn that spin-down has been executed for the administrator-desired storage device, and that there is a target disk device for which the spin-down count exceeds the prescribed count threshold value.

The preceding is the details of processing related to the indication and execution of a spin-down. The particular processing flow for S110 of FIG. 7 is not shown in the figure, but, for example, this flow is as follows. That is, the spin indication receiving program 263 prepares indication results data denoting that spin-down of the disk device belonging to the administrator-desired storage device could not be executed, and the reason why it could not be executed (for example, the spin-down target LU has the LU attribute "I/O"). When the power-saving status transitions from "I/O monitoring" to "spin-up" due to the fact that an I/O command was received for the spin-down target LU while this spin-down target LU was undergoing I/O monitoring, the spin indication receiving program 263 incorporates information signifying this fact (for example, information signifying that spin-down was not performed because an I/O command was received during I/O monitoring) in the indication results data. This indication results data is sent to the management console 171, and displayed by the spin indication program 273, thereby enabling the administrator to learn that spin-down was not executed for the administrator-desired storage device, and the reason why the spin-down was not executed.

For example, when the I/O response status "Not Ready" is set in the above-mentioned indication results data for an integrated LU comprising the spin-down target LU and a LU other than the spin-down target LU (another LU), information denoting this fact can also be included in the indication results data. Or, when a host computer 121 receives "Not Ready" as an I/O command return value, the management console 171 can be queried as to the fact that the I/O command for the host LUN specified in this I/O command cannot be executed. In prescribed situations, such as when the spin indication program 273 recognizes from the received indication results data that the I/O response status "Not Ready" has been set for another LU in the integrated LU, or when the above-mentioned query is received from a host computer 121, the message shown in FIG. 27 can be displayed. Accordingly, the administrator is able to perform a setting in the storage system 100 for generating an I/O conforming to the I/O command to the other LU in the integrated LU.

Figure 13:
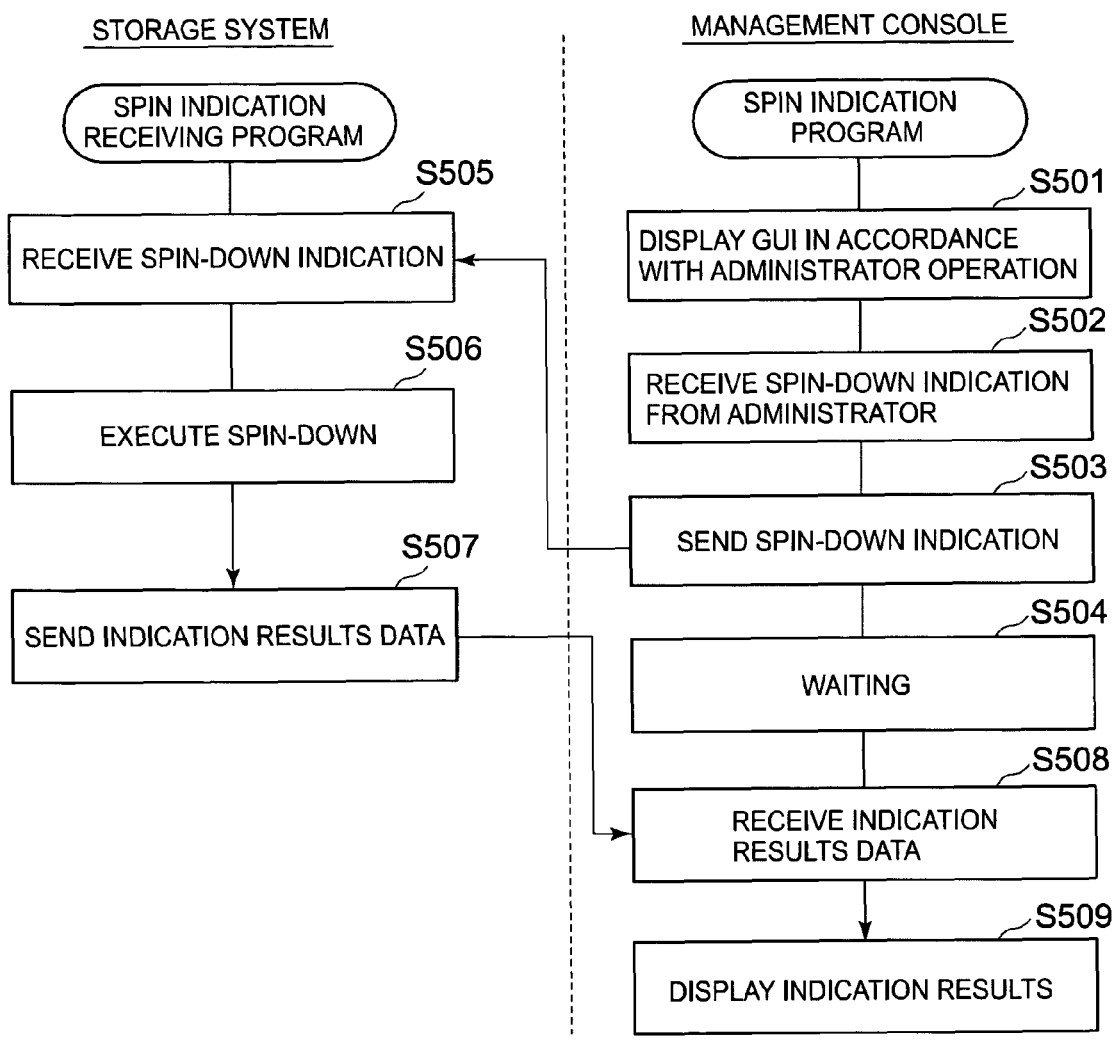
FIG. 13 shows an example of the overall flow of processing related to the indication and execution of a spin-up.

FIG. 13 shows an example of the overall flow of processing related to the indication and execution of a spin-up.

In S501, the spin indication program 273 displays a graphical user interface (GUI) on the display device 175 in accordance with an operation by an administrator on the management console 171. This GUI, for example, is constituted so as to be able to receive a spin-up indication for at least one unit from among a RAID group, LU, and disk device. More specifically, for example, the GUIs illustrated in FIG. 8A and FIG. 8B can be displayed.

In S502, the spin indication program 273 receives via this GUI a specification for an administrator-desired storage device (at least one of a RAID group, LU or disk device) and a spin-up indication.

In S503, the spin indication program 273, upon receiving a spin-up indication from an administrator, prepares a spin-up indication (command), which specifies the administrator-desired storage device, and sends this spin-up indication to the storage system 100. Thereafter, the spin indication program 273 transitions to a state in which it waits for a response from the storage system 100 (S504).

In S505, the spin indication receiving program 263 in the storage system 100 receives the spin-up indication from the management console 171.

In S506, the spin indication receiving program 263 executes spin up of one or more disk devices (hereinafter, spin-up target disk devices) belonging to the storage device specified in this spin-up indication.

In S507, the spin indication receiving program 263 sends to the management console 171 data (indication results data) denoting the results related to the spin-up indication from the management console 171.

In S508, the spin indication program 273 in the management console 171 receives the indication results data.

In S509, the spin indication program 273 displays the indication results denoted in the indication results data on the display device 175.

The preceding is one example of the overall flow of processing related to the indication and execution of a spin-up. Each step of this overall processing flow will be explained in detail hereinbelow.

FIG. 14 shows an example of the detailed flow of processing executed in S506 of FIG. 13.

In S506A, the spin indication receiving program 263 sets "spin-up processing" as the power-saving status for the spin-up target disk device in the respective tables 255 and 257.

In S506B, the spin indication receiving program 263 calculates how many disk devices having the power-saving status "spin-up" exist within the range of the spin-up target disk device (number of spin-up disks) by referencing the disk management table 257, and calculates how many of those disk devices have had I/O generated (number of I/O generation disks). Furthermore, "range" as used here can refer to the overall storage system, a RAID group or an enclosure. Hereinafter, this range will be called the "device range" for convenience sake.

In S506C, the spin indication receiving program 263 determines a spin-up plan based on the calculated number of spin-up disks and I/O generation disks.

In S506D, the spin indication receiving program 263 indicates spin-up to the spin-up target disk device in accordance with the determined spin-up plan.

In S506E, the spin indication receiving program 263 sets "spin-up" as the power-saving status for the spin-up target disk device, which reports spin-up-end. Further, when it is identified from the LU management table 255 that the I/O response status of the LU to which this spin-up target disk device belongs is "Not Ready", the spin indication receiving program 263 sets "normal" as this I/O response status. However, if the LU to which this spin-up target disk device belongs is an LU constituting an integrated LU, and another LU constituting this integrated LU is I/O response status "Not Ready", the spin indication receiving program 263 also sets the I/O response status of this LU to "Not Ready", and when the I/O response status of this other LU can be set to "normal", the spin indication receiving program 263 sets the I/O response status of this LU to "normal" also.

In S506F, the spin indication receiving program 263 determines whether or not spin-up-end reports have been received from all the spin-up target disk devices for which spin-up was indicated. If these reports have been received, S506F is YES, and S506 ends, but if these reports have not been received, S506F is NO, and processing returns to S506E.

The preceding is one example of the detailed flow of processing executed in S506 of FIG. 13. A spin-up disk, I/O generation disk and spin-up plan will be explained hereinbelow.

In this embodiment, as explained hereinabove, a spin-up disk is a disk device for which the power-saving status is "spin-up", but in addition, there is a disk device for which the rotating speed of the disk inside this disk device constitutes a first speed, which is the speed at I/O, and there is also a disk device for which the rotating speed of the disk inside this disk device constitutes a certain second speed, which is a slower speed than the first speed, and is the speed of the idling state. When the power-saving mode transitions from a spin-down to a spin-up, processing is executed for rotating a disk in the disk device at the first speed, and thereafter, for continuing to rotate the disk at the second speed, which is the speed at idling, and which is a slower speed than the first speed. For this reason, the change in power consumption from spin-down to spin-up for one disk device can be such that power consumption rises due to the rotation of the disk at the first speed, reaching a peak, and thereafter, this power consumption decreases due to the continued rotation of the disk at the second speed, dropping to a certain value and stabilizing.

Figure 15A:
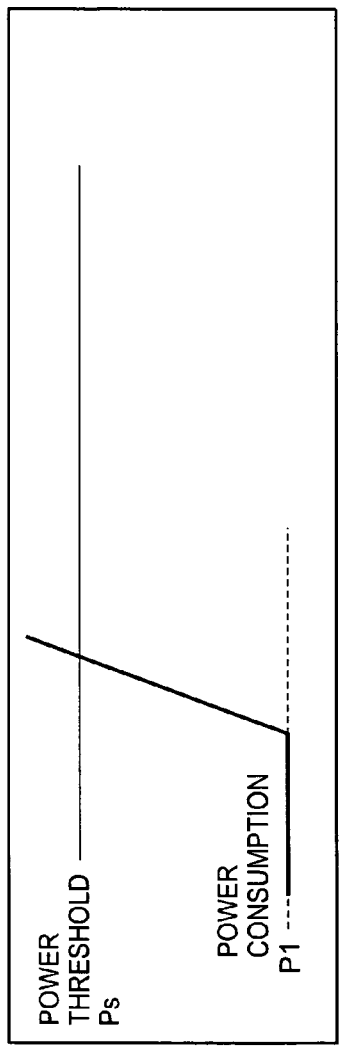
FIG. 15A shows an example of the change in power consumption when a number of disk devices simultaneously undergoing a spin-up are not controlled.

Conversely, when a plurality of spin-up target disk devices are subjected to spin-up, simultaneously spinning up all the spin-up target disk devices is considered a method for shortening to the utmost the length of time for these plurality of spin-up target disk devices to achieve spin-up. However, in this method, since the power consumption of all the spin-up target disk devices peaks at the same time, the problem arises that when a prescribed power threshold value Ps is provided for a device range (for example, the entire storage system, a RAID group or an enclosure), as shown in FIG. 15A, power consumption becomes extremely great at this point in time, ultimately exceeding this prescribed power threshold value Ps.

Figure 15B:
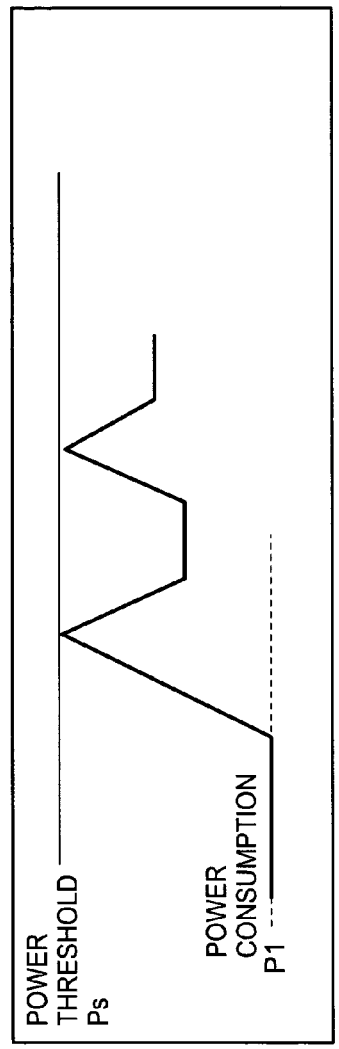
FIG. 15B shows an example of changes in power consumption when a number of disk devices simultaneously undergoing a spin-up are controlled.

A method for avoiding this problem is to control the number of disk devices that are spun up simultaneously. For example, as illustrated in FIG. 15B, at a first point in time, a portion of the plurality of spin-up target disk devices is simultaneously spun up, and at a second point in time subsequent to the power consumption of this portion of the disk devices stabilizing, the remainder of the spin-up target disk devices is simultaneously spun up. Accordingly, power consumption that exceeds the power threshold value Ps can be prevented until spin-up for all the spin-up target disk devices ends. Furthermore, at the respective points in time, the number of spin-up target disk devices being simultaneously spun up is controlled based on how many spin-up disks exist in the device range, that is, the number of spin-up disks in the device range. This is because a spin-up disk also consumes power.

However, it is felt that power consumption in the device range cannot always be held below the power threshold value Ps by simply implementing control on the basis of the number of spin-up disks. This is because the power consumption of a disk device is greater when data I/O is occurring than in the spin-up state. That is, it is because, when an I/O occurs in a disk device (for example, when an I/O command is sent to this disk device), the rotating speed of the disk device increases to a higher speed than the rotation speed at idling, and consequently, power consumption also increases.

Figure 15C:
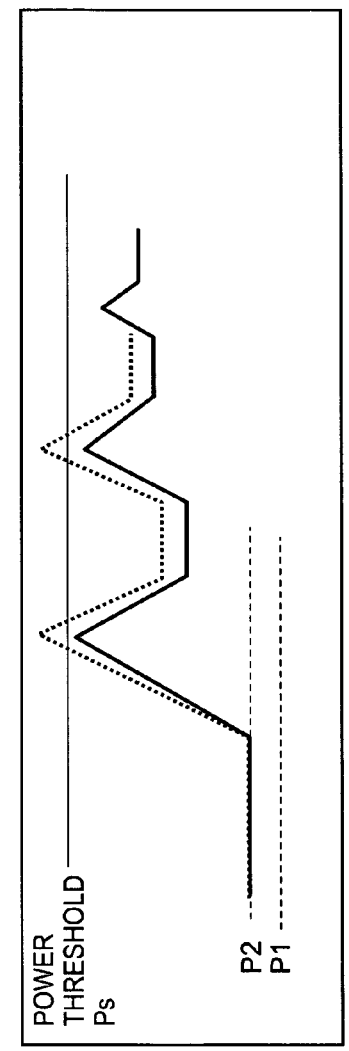
FIG. 15C shows an example of changes in power consumption when a number of disk devices simultaneously undergoing a spin-up are controlled on the basis of whether or not I/O is occurring to a disk drive for which the spin-up is complete.

More specifically, for example, as illustrated in FIG. 15C, when a plurality of spin-up disks are all idling, it is supposed that power consumption prior to a plurality of spin-up target disk devices being spun up is P1, and when these plurality of spin-up disks comprise an I/O generation disk, this power consumption is considered to be P2, which is higher than P1. In this case, controlling the number of spin-up target disk devices to be spun up simultaneously based simply on the number of spin-up disks raises the fear that power consumption will exceed the power threshold value Ps as indicated by the dotted line.

Accordingly, in this embodiment, the number of spin-up target disk devices to be spun up simultaneously is controlled on the basis of how many of the spin-up disks are I/O generation disks. In this case, for example, as illustrated in FIG. 15C, spin-up indication times become more numerous, and consequently the length of time until spin-up ends for all the spin-up target disk devices becomes longer than when an I/O generation disk is not taken into account, but it is possible to reliably prevent power consumption from exceeding the power threshold value Ps.

Furthermore, in this embodiment, the control program 253 is constituted such that, for example, at the initial point in time, as many spin-up target disk devices as possible are simultaneously spun up in a range that does not exceed the power threshold value Ps, and at the subsequent point in time and beyond, as many spin-up target disk devices as possible are simultaneously spun up at that point in time in a range that does not exceed the power threshold value Ps. There can be a limit on the number of disk devices that the control program 253 is capable of spinning up at the same time, and in this case, the number of spin-up target disk devices simultaneously spun up at the respective points in time can be controlled on the basis of this limitation in addition to the power threshold value Ps.

Further, the number of disk devices spun up simultaneously can also be controlled by treating all the spin-up disks as I/O generation disks, but so doing makes it necessary to reduce the number of disk devices to be spun up simultaneously, consequently raising the fear of lengthening the time until the spinning up of all the spin-up target disk devices ends. In this embodiment, it is possible to distinguish between a spin-up disk that is an I/O generation disk, and a disk device that is not (an idling disk device), and to control the disk devices that are spun up simultaneously, thereby making it possible to end spin up of all spin-up target disk devices in as short a time as possible, while holding power consumption below the power threshold value. Incidentally, the above-mentioned spin-up plan denotes how many spin-up target disk devices will be spun up and at what point in time.

The preceding is explanations of a spin-up disk, I/O generation disk and spin-up plan.

Now then, next the processing flows performed by the I/O control program 261, event execution control program 267 and setting control program 277 will be explained by referring to FIGS. 16A through 16C.

FIG. 16A shows an example of the flow of processing executed by the I/O control program 261.

When an I/O command specifying a host LUN is received from a host computer 121 (S601), the I/O control program 261 identifies the I/O response status corresponding to this host LUN by referencing the LU management table 255 (S602). Then, the I/O control program 261 sends a response based on this identified I/O response status to the host computer 121 (S603).

FIG. 16B shows an example of the flow of processing executed by the event execution control program 267.

The event execution control program 267 monitors for the generation of an event (S611). If an event is generated (S612: YES), the event execution control program 267 controls the approval/disapproval of event execution (that is, whether or not to permit the execution of the event) and/or the power-saving status of an LU and a disk device related to this generated event (hereinafter, the target LU and the target disk device) based on the type of event that was generated and the power-saving status of the target LU and the target disk device (S613).

Concrete examples of the relationships between events and the execution approval/disapproval thereof are shown in FIG. 26.

That is, the receiving of a command can be cited as one example of the generation of an event. This command can be received from a host computer or the management console, and it can be generated inside the storage system. Commands include, for example, form LU pair, execute copying for LU pair, split LU pair, and so forth, and are commands for controlling an LU pair. For example, executing a command such as form LU pair, or execute copying for LU pair can necessitate spinning up a spin-down disk device (for example, when a data I/O is generated to an LU), and if the power-saving status of this LU is "I/O monitoring", the event execution control program 267 decides to cancel spin-down (That is, the event execution control program 267 advances the processing of the spin indication receiving program 263 from S107 to S110 of FIG. 7). However, if this power-saving status is "spin-down processing" or "spin-down", the event execution control program 267 denies the execution of the event. Accordingly, priority can be placed on saving power. Conversely, when executing a command like split LU pair, which does not necessitate spinning up a spin-down disk device (for example, when a data I/O is not generated to a secondary LU), command execution is approved no matter what the power-saving status of this LU is.

As another example of event generation, there is a failure, and more specifically, the occurrence of a blocked disk device or a write-incomplete. In this case, if the power-saving status of the LU related to the failure is not "spin-up", the event execution control program 267 changes to this power-saving status. In other words, even if processing for performing a spin-down is being executed in accordance with a spin-down indication, the event execution control program 267 cancels this processing, and executes processing for performing a spin-up (For example, the event execution control program 267 indicates spin-up to the respective disk devices of the LU related to the failure, and sets the power-saving status of these disk devices to "spin-up").

As yet another example of event generation, there is failure recovery. More specifically, it is correction copying, which will be explained hereinbelow. In this case, when the power-saving status of the disk device related to a failure recovery is not "spin-up", the event execution control program 267 can issue a spin-up indication to this disk device, and when this failure recovery is over, the event execution control program 267 can take advantage of the end of this failure recovery to spin down this disk device.

The above-mentioned control is performed inside the storage system 100, but substantially the same control can also be executed by the management console.

FIG. 16C shows an example of the flow of processing executed by setting control program 275.

That is, the setting control program 275, upon receiving a setting indication from an administrator (for example, an indication of an information setting, or an indication of the execution of an administrator-desired process) (S621), controls the approval/disapproval of the setting indication based on the type of this setting indication, and on the power-saving status of the LU or disk device related to this setting indication (hereinafter, the target LU and target disk device) (S622).

More specifically, for example, the LU management table 255 and disk management table 257 acquired from the storage system 100 are stored in the memory 177 of the management console 171. The setting control program 275, for example, upon receiving a setting indication from an administrator to execute processing for generating an I/O to a certain LU for executing copying between a pair of LUs, sends this setting indication to the storage system 100 if the power-saving status of this certain LU is "I/O monitoring", and if this power-saving status is "spin-down processing", "spin-down", or "spin-up processing", the setting control program 275 denies the administrator permission to send this setting indication.

The preceding are explanations of the flows of processing performed by the I/O control program 261, the event execution control program 267 and the setting control program 275.

Now then, processing performed by the disk checking program 265 will be explained next.

Figure 17A:
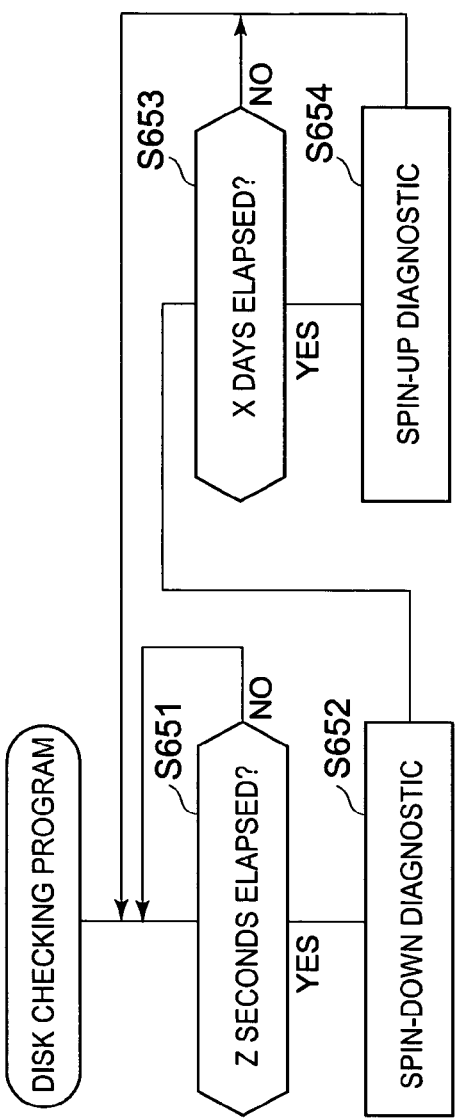
FIG. 17A shows the overall flow of processing executed by a disk checking program 265.

FIG. 17A shows the overall flow of processing executed by the disk checking program 265.

Every time Z seconds (Z>0) elapses (S651: YES), the disk checking program 265 performs a spin-down diagnostic for a disk device having a power-saving status of "spin-down" (S652).

Further, the disk checking program 265 references the disk management table 257 and identifies a disk device, which is a disk device having a power-saving status of "spin-down", and for which a spin-up diagnostic has not been performed for X days (X>0, X days >Z seconds) from the end of the last spin-up diagnostic (S653: YES), and performs a spin-up diagnostic for this identified disk device (S654).

In the above-mentioned processing flow, the passage of Z seconds and X days can be specified using the timer 391A. Further, the above-mentioned processing flow can be executed in units such as one disk device, one or more disk devices of a single LU, two or more disk devices of a single RAID group, a plurality of disk devices inside a single enclosure, or a large number of disk devices in a storage system. The performing of the above-mentioned processing flow in a RAID group unit will be explained in more detail below.

Figure 17B:
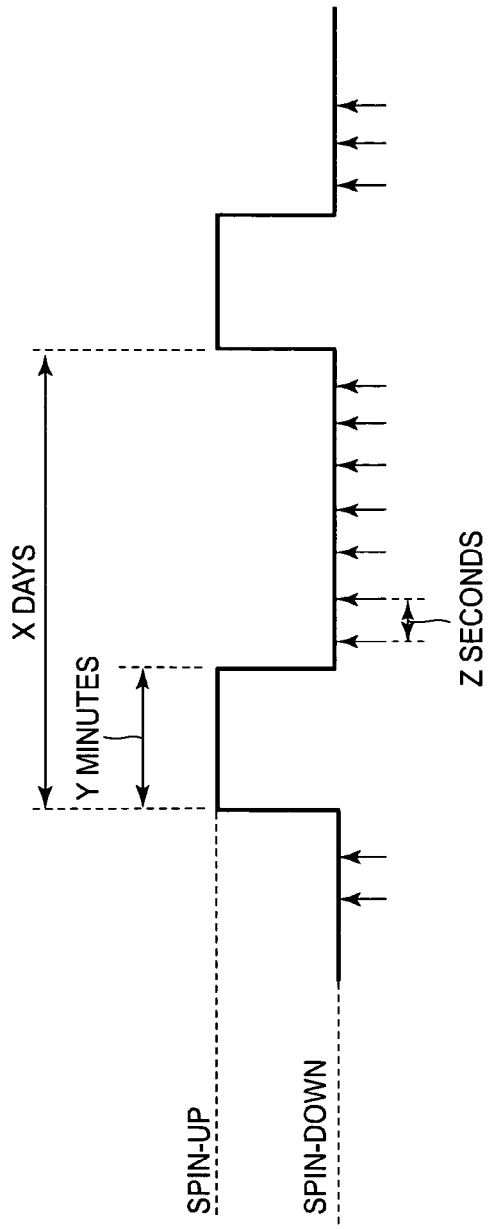
FIG. 17B is a diagram, which gives as an example the overall flow of processing shown in FIG. 17A executed in a RAID group unit, and which shows this flow in a time chart format.

FIG. 17B is a diagram, which gives as an example the overall flow of processing shown in FIG. 17A executed in a RAID group unit, and which shows this processing flow in a time chart format.

The disk checking program 265 every Z seconds sends a first type control command, which differs from an I/O command, to a disk device of the power-saving status "spin-down" in the target RAID group. Z seconds, for example, is one second. If the disk checking program 265 sends a control command to a first spin-down disk device of the target RAID group, after this Z time period, it sends a control command to the second spin-down disk device in the target RAID group. That is, the destination of the control command sent every Z time period is not the same disk device, but rather a different disk device. For this reason, the length of time until the next time a control command is sent to the same disk device will differ in accordance with how many spin-down disk devices there are in the target RAID group. Further, the first type of control command sent here, for example, is an Inquiry command supported by the SCSI protocol. Upon receiving an Inquiry command, the control command processor 104D inside a disk device (refer to FIG. 24B) sends a prescribed response to the disk checking program 265. Therefore, if the prescribed response is not returned even though an Inquiry command has been sent, it could be that the disk device, which was the destination of this Inquiry command, has been removed from the storage system 100, or that an abnormality has occurred in the communication path between this disk device and the CPU 133. This control command is not limited to an Inquiry command, and another type of control command can be used instead as long as it is a control command that is capable of responding even during spin-down.

The disk checking program 265 performs a spin-up diagnostic for a disk device, which is a disk device of the power-saving status spin-down in the target RAID group, and for which a spin-up diagnostic has not been performed for X days since the time the previous spin-up diagnostic ended (end time identified from the disk management table 257). More specifically, the disk checking program 265 initiates spin up by indicating a spin-up to this disk device, and sends a second type of control command that differs from an Inquiry command, for example, a verify command supported by the SCSI protocol. By analyzing the return value of this verify command, the disk checking program 265 can detect if there is a media error or head error, which will be explained below, in this disk device. Furthermore, the sending of a verify command for executing a spin-down diagnostic is performed in Y minutes (Y>0, X days >Y minutes >Z seconds). A verify command is sent a plurality of times during this Y minutes, and each time the destination of the verify command can be different or the same. Furthermore, X days, for example, is 90 days, and Y minutes, for example, is 10 minutes. The value of X, for example, can be determined from the standpoint of preventing the head from sticking to the disk due to being kept in spin-down.

Figure 18:
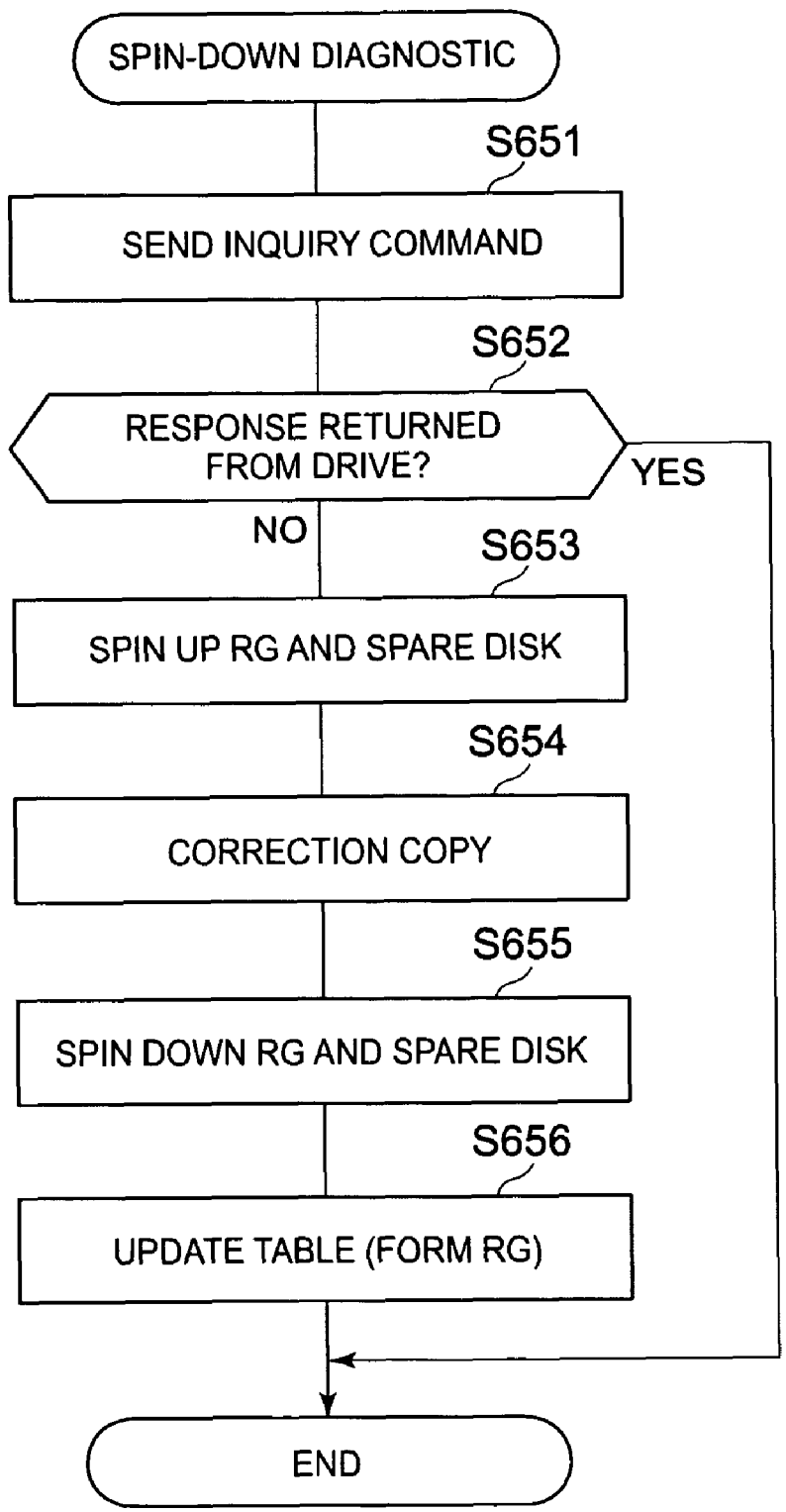
FIG. 18 shows an example of the flow of processing of a spin-down diagnostic.

FIG. 18 shows an example of the flow of processing of a spin-down diagnostic. This figure is one example of the processing flow for one disk device in a target RAID group.

In S651, the disk checking program 265 sends an Inquiry command to a certain spin-down disk device of a target RAID group. When the prescribed response is not returned, S652 is NO and processing proceeds to S653, and when the prescribed response is returned, S652 is YES and the spin-down diagnostic for this one disk device ends. Once the Z time period has elapsed following the Inquiry command being sent in S651, a spin-down diagnostic is performed for another disk device in the target RAID group.

Figure 20A:
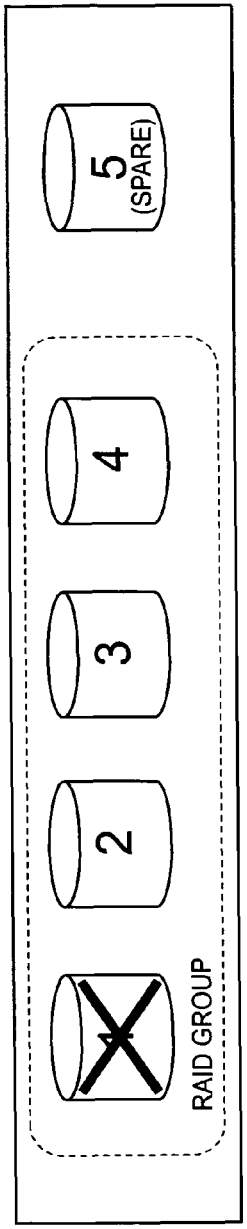
FIG. 20A shows an example in which there is either no reply from, or a failure has occurred in one of the disk devices of a target RAID group.

In S653, the disk checking program 265 respectively indicates spin-up to all other spin-down disk devices belonging to the target RAID group (disk devices other than those for which the prescribed response was not returned), and an arbitrarily selected spare disk device. More specifically, for example, when the prescribed response was not returned from disk device "1" in the target RAID group as shown in FIG. 20A, the disk checking program 265 indicates spin-up to the other disk devices "2", "3" and "4" in the target RAID group, and to the spare disk device "5"

Figure 20B:
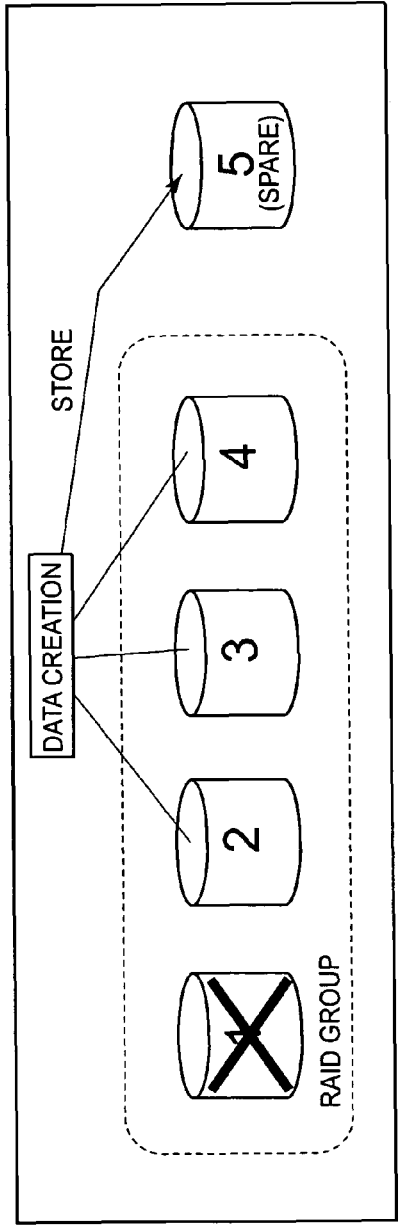
FIG. 20B shows the performing of correction copying to a spare disk device from the disk devices remaining in the target RAID group.

In S654, the disk checking program 265, for example, executes correction copying upon receiving a spin-up-end report from all the other disk devices and the spare disk device for which spin-up was indicated. More specifically, for example, as shown in FIG. 20B, the disk checking program 265 respectively reads out data from disk devices "2", "3" and "4", uses the read-out data for performing a prescribed process to generate new data, and stores this new data in spare disk device "5". Furthermore, correction copying, for example, is performed because the target RAID group is a RAID constituted at a prescribed RAID level, such as RAID5, but, for example, when the target RAID group is the RAID1 mirroring constitution, when a prescribed response to an Inquiry command is not returned from one disk device, the disk checking program 265 can spin up the other disk devices and the spare disk device, and instead of correction copying, can perform processing for copying all the data inside these other disk devices to the spare disk device.

In S655, the disk checking program 265 indicates spin-down to the other disk devices and spare disk device that were spun up in S653.

Figure 20C:
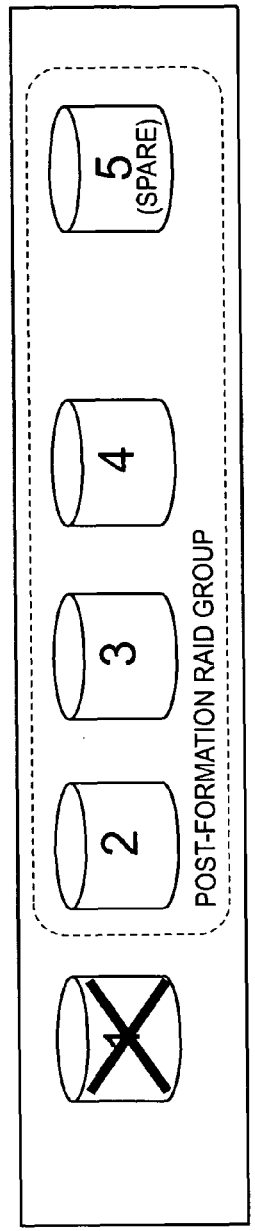
FIG. 20C shows the formation of a RAID group.

In S656, the disk checking program 265, for example, updates the disk management table 257 upon receiving a spin-down-end report from all the other disk devices and the spare disk device for which spin-down was indicated. More specifically, for example, as shown in FIG. 20C, a RAID group is constituted from disk devices "2", "3" and "4", and spare disk device "5" (That is, a RAID group is formed). In this case, in the updated disk management table 257, for example, there is no change to the RG ID of the target RAID group, the disk ID of disk device "1" is removed, and the disk ID of the spare disk device "5" is added as the disk ID that is correspondent to the RG ID. Further, the storage LU range of disk device "1" is set as the storage LU range of the spare disk device "5".

The preceding is the processing flow of a spin-down diagnostic. When an abnormality related to a spin-down disk device is detected in accordance with this spin-down diagnostic (for example, when a response cannot be received from this disk device due to the disk device having been removed, or due to a failure in the communication path to the disk device), copying is executing to a spare disk device based on data inside the other disk device in the target RAID group to which this disk device belongs, and RAID group formation is executed such that this spare disk device constitutes a component of the target RAID group instead of this disk device. Thus, even if a disk device is in the spin-down state, if an abnormality related to this disk device is detected, it is possible for data to continue to be stored properly.

Figure 19:
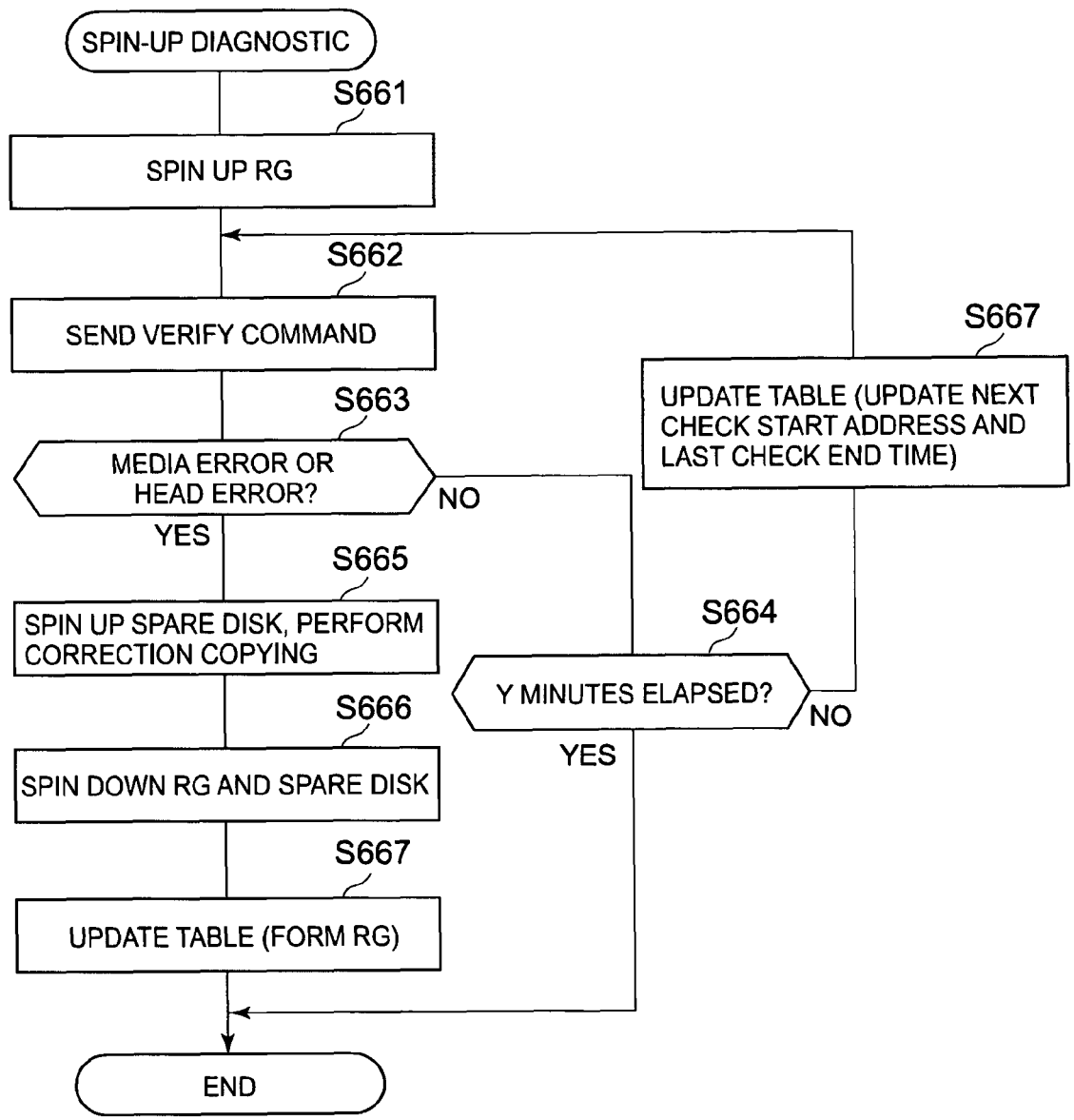
FIG. 19 shows an example of the flow of processing of a spin-up diagnostic.

FIG. 19 shows an example of the flow of processing of a spin-up diagnostic.

In S661, the disk checking program 265 indicates spin-up to all spin-down disk devices of the target RAID group.

In S662, the disk checking program 265, for example, upon receiving a spin-up-end report from a disk device to which spin-up has been indicated, sends a verify command to this disk device. For example, a next check start address corresponding to this disk device (an address identified from the disk management table 257) is specified in this verify command. In accordance with this verify command, the disk device performs a check for a media error at the address specified in this verify command. Media error as used here refers to a failure for one reason or another to read out a data block from this specified address. In checking for this media error, the head inside the disk device moves, and consequently, if there is a failure in the head, a head error is detected. When a disk device fails to read out a data block, the disk device returns a media error to the disk checking program 265, and when a head error is detected, the disk device returns a head error to the disk checking program 265, and when neither type of error is detected, the disk device returns no error to the disk checking program 265.

In S663, when the disk checking program 265 receives a media error or a head error, S663 is YES and processing proceeds to S665, and when the disk checking program 265 receives no error, S663 is NO and processing proceeds to S664.

In S664, when Y minutes have not elapsed following the start of this spin-up diagnostic (S664: NO), the disk checking program 265 updates the next check start address in the disk management table 257 for the disk drive that reported no error, and records the time this no error report was received as the last check end time (S668). Then, the disk checking program 265 performs S663 for the other disk devices that have reported spin-up-end. Conversely, when Y minutes have elapsed (S664: YES), the disk checking program 265 terminates this spin-up diagnostic.

In S665, the disk checking program 265 sends a spin-up indication to an arbitrarily selected spare disk device, and upon receiving spin-up-end from this spare disk device, executes correction copying. Here, FIGS. 20A through 20C are used as examples, and disk device "1" has returned a head error or a media error.

In S666, the disk checking program 265 indicates spin-up to a disk device other than the disk device that returned a head error or a media error (Using FIG. 20B as an example, this would be disk devices "2", "3" and "4", and spare disk device "5").

In S667, the disk checking program 265, for example, updates the disk management table 257 upon receiving spin-up-end reports from all the other disk devices and spare disk device for which spin-down had been indicated.

The preceding is the processing flow of a spin-up diagnostic. According to the above explanation, a spin-up diagnostic is regularly executed for a disk device that remains in spin-down. Even if spin-down continues as-is, a media error or head error can occur in a disk device by reason of aging, but in this embodiment, spin-up diagnostics are regularly performed, and a disk device, in which a media error or head error is detected, is removed from the RAID group. That is, a disk device, in which a media error or a head error has occurred due to aging or the like, can be removed from the RAID group prior to data being stored therein. Consequently, it is possible to hold down the risk of losing data by writing this data to a disk device in which a media error or head error has occurred.

Second Embodiment

A second embodiment of the present invention will be explained. Mainly the points of difference with the first embodiment will be explained at this time; the points in common with the first embodiment will be omitted or simplified.

FIG. 21A shows a block diagram of an expansion enclosure 101B in a second embodiment of the present invention.

The second embodiment further comprises a sub-controller 111, timer 391B, CPU153, and memory 154. The CPU 153 and memory 154 are connected to a transmission control circuit 141B. The CPU 153 functions as a processor (enclosure monitoring processor) for monitoring the state of a resource inside the expansion enclosure 101B by executing a computer program stored in the memory 154. The CPU 153 can be a device in an I/F used for data transmission (for example, a circuit for converting a FC I/F and SATA I/F, or an SAS expander). Further, a hardware circuit for performing enclosure monitoring can be provided instead of the CPU 153.

FIG. 21B is a schematic diagram of the computer programs and information stored in memory 154.

The computer program, which is stored in memory 154 and executed by CPU 153, is a control program 653 for performing prescribed control. The control program 653, for example, comprises an enclosure monitoring program 661 for monitoring the state of a resource inside the expansion enclosure 101B, and a monitoring results reporting program 663 for reporting the results of enclosure monitoring to the main controller 107 inside the main enclosure 101A. The enclosure monitoring program 661 stores monitoring results information 251 in the memory 154. Monitoring results information 251 is information denoting the results of enclosure monitoring, and, for example, is information comprising the disk ID of a disk device for which a prescribed response has not been returned.

Figure 22A:
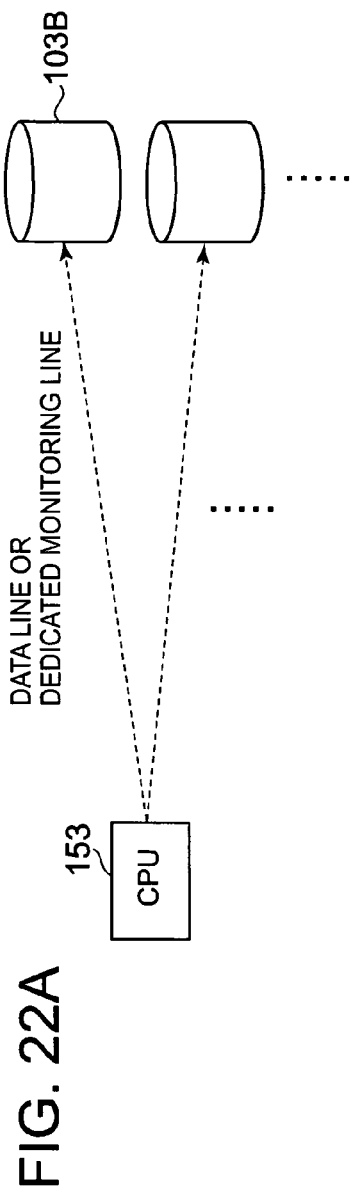
FIG. 22A is a schematic diagram of the monitoring of a disk device 103B by an enclosure monitoring processor 153.

In this second embodiment, as shown in FIG. 22A, the CPU 153, which executes the enclosure monitoring program 661, can send a prescribed control command to the respective disk devices 103B inside the same expansion enclosure 101B as the CPU 153 (hereinafter, referred to as "own enclosure" for the sake of convenience) via a data line or dedicated monitoring line, and detect if a disk device 103B has been removed by whether or not there is a prescribed response to this control command.

Here, a data line is a line through which data targeted by an I/O command from a host computer 121 flows. A dedicated monitoring line is a signal line provided in addition to a data line.

Further, an SES (SCSI Enclosure Services) command can be used as a control command for use in enclosure monitoring. Sending an SES command to a prescribed device inside the CPU's own enclosure 101B, for example, makes it possible to acquire the status of the power source, the temperature, the rotation rate of the fan, and so forth. Sending this SES command to a disk device 103B makes it clear whether or not this disk device 103B is mounted. Even if a disk device 103B is in the spin-down state, since the power to the control command processor 104D, which receives and processes the SES command, is ON, the CPU 153 will at least receive a response relative to the SES command if this disk device 103B is mounted.

Figure 22C:
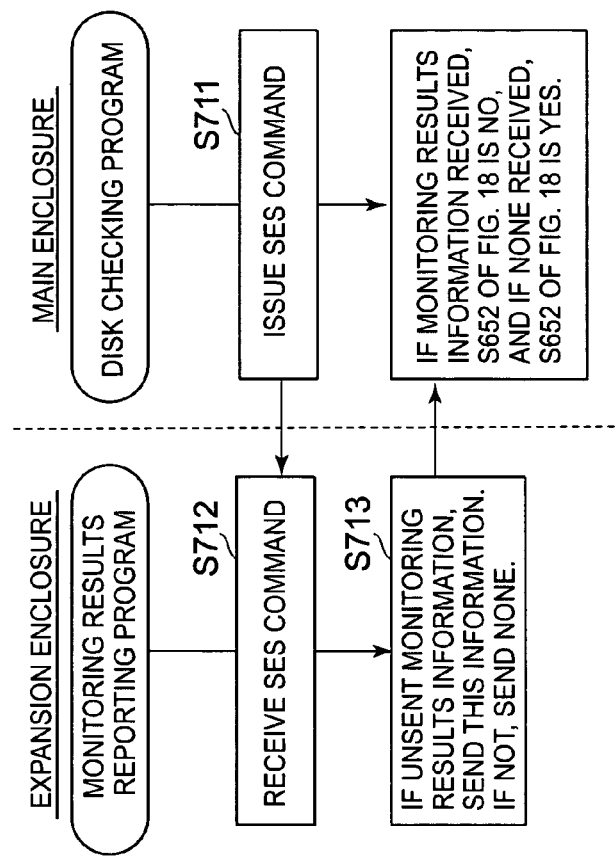
FIG. 22C shows an example of the flow of processing executed by a disk checking program 265, an example of the flow of processing executed by monitoring results reporting program 663, and the correlation of these processes.
Figure 22B:
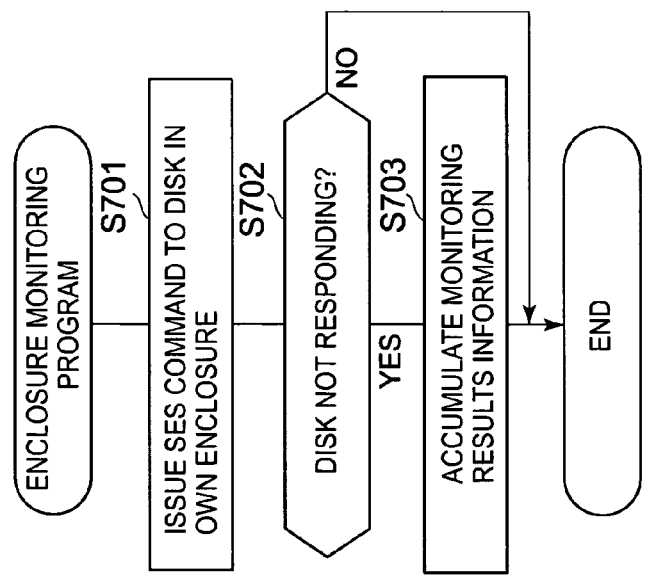
FIG. 22B shows an example of the flow of processing executed by an enclosure monitoring program 661.

FIG. 22B shows an example of the flow of processing performed by the enclosure monitoring program 661.

The enclosure monitoring program 661 sends an SES command to a disk device 103B inside its own enclosure 101B (S701). When there is no response relative to this SES command (S702: YES), monitoring results information 251 signifying that this disk device 103B is not mounted is accumulated in the memory 154 (S703). If the monitoring results information 251 already exists in the memory 154, information signifying that this disk device 103B is not mounted can be added to the monitoring results information 251.

The enclosure monitoring program 661 can regularly (for example, constantly) check for the presence or absence of a disk device 103B inside its own enclosure 101B by executing this process.

FIG. 22C shows an example of the flow of processing performed by a disk checking program 265, an example of the flow of processing performed by a monitoring results reporting program 663, and the correlation of these processes.

The disk checking program 265 regularly (for example, every Z seconds) sends an SES command to the sub-controller 111 (S711).

The monitoring results reporting program 663 in the sub-controller 111 receives the SES command (S712). If there is monitoring results information 251 in memory 154 that has still not been sent to the sub-controller 111, the monitoring results reporting program 663 sends this unsent monitoring results information 251 to the main controller 107, and if there is no unsent monitoring results information 251, the monitoring results reporting program 663 sends "None" to the main controller 107 (S713).

If monitoring results information 251 is received, the disk checking program 265 sets S652 of FIG. 18 to No, and if None is received, sets S652 of FIG. 18 to YES.

The preceding is an explanation of the second embodiment.

In the first embodiment, the CPU 133 of the main controller 107 determines whether or not spin-down disk devices 103A, 103B are mounted by sending an Inquiry command to the respective disk devices 103A, 103B, but this determination can also be made via the method of the above-described second embodiment instead. That is, an enclosure monitoring processor, which performs monitoring of its own enclosure 101B and reports the results of this monitoring, can be mounted in the respective expansion enclosures 101B, and the CPU 133 of the main controller 107 can identify the presence or absence of a disk device in the respective expansion enclosures 101B by regularly (or irregularly) querying the enclosure monitoring processor. Furthermore, in the second embodiment, the CPU 133 can perform the same method as that of the first embodiment for determining the presence or absence of a disk device 103A inside the main enclosure 101A.

Third Embodiment

In a third embodiment, a spin indication receiving program 263 can determine if I/O monitoring is to be performed subsequent to receiving a spin-down indication, or if spin-down is to be executed without performing I/O monitoring, in accordance with whether I/O or spin-down has priority.

Figure 23A:
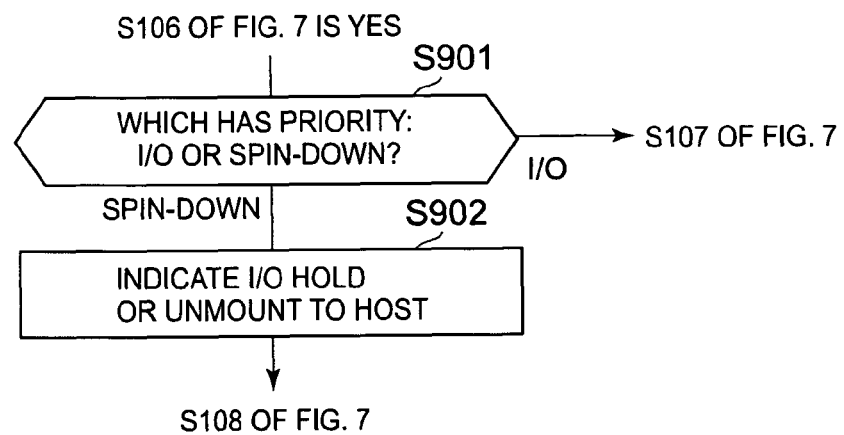
FIG. 23A shows the difference between a third embodiment and the first embodiment regarding the overall processing flow related to a spin-down indication and execution.

FIG. 23A shows the difference between the third embodiment and the first embodiment regarding the overall processing flow related to a spin-down indication and execution.

The spin indication receiving program 263, subsequent to a YES in S106 of FIG. 7, determines whether I/O or spin-down has priority (S901), and if I/O has priority, executes S107 of FIG. 7 (I/O monitoring), and if spin-down has priority, performs S108 of FIG. 7 without performing I/O monitoring. At this time, in S902, for example, the spin indication receiving program 263 can indicate to the host computer 121 to unmount an LU (hereinafter, target LU) corresponding to either a I/O hold or an administrator-desired storage device. An I/O hold is processing, which signifies that an I/O command specifying the target LU will not be processed, and, for example, which returns a busy or retry request to the host computer 121 relative to the I/O command.

Figure 23B:
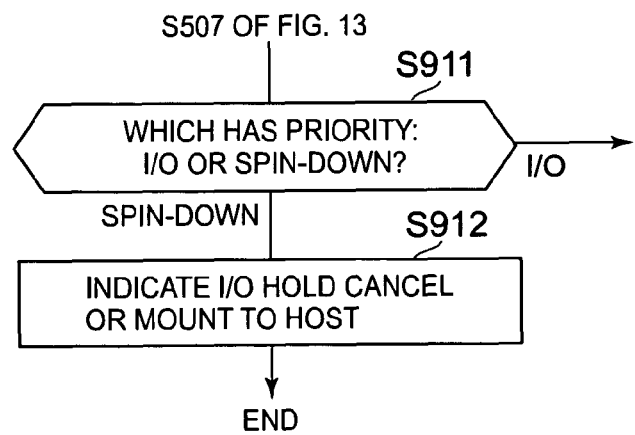
FIG. 23B shows the difference between a third embodiment and the first embodiment regarding the overall processing flow related to a spin-up indication and execution.

FIG. 23B shows the difference between the third embodiment and the first embodiment regarding the overall processing flow related to a spin-up indication and execution.

The spin indication receiving program 263, subsequent to S507 of FIG. 13, determines whether I/O or spin-down has priority (S911), and if I/O has priority, terminates processing, and if spin-down has priority, indicates to the host computer 121 to either cancel I/O hold or mount the target LU (S912).

The prescribed device unit for which I/O priority or spin-down priority is to be set can be preset to a storage system 100, enclosure, RAID group, LU or disk device unit. The setting for making I/O the priority or making spin-down the priority, for example, can be performed relative to the storage system 100 from the management console 171.

The preceding is explanations of a number of embodiments of the present invention, but these are examples for explaining the present invention, and do not purport to limit the scope of the present invention to these embodiments alone. The present invention can be put into practice via a variety of other aspects. For example, the spin indication receiving program 263 can cancel processing for a storage device (RAID group, LU or disk device), which is targeted for processing in S105 through S108 of FIG. 7, when a spin-up indication is received from the management console 171.

What is claimed is:

1. A storage system which receives an I/O command sent from a computer, and which is coupled to a management device, the storage system comprising:
a plurality of physical storage devices which form a plurality of Redundant Array of Inexpensive Disks (RAID) groups, the RAID groups in which a plurality of logical units are provided;
a power-saving indication receiving section which receives from the management device a power-saving indication specifying a RAID group in the plurality of RAID groups;
a logical unit type identifying section identifying the logical unit type of a logical unit which is provided in the specified RAID group; and
a power-saving controller which determines whether or not the identified logical unit type is a prescribed logical unit type, and if this identified logical unit type is the prescribed logical unit type, performs power-saving to one or more physical storage devices corresponding to the specified RAID group, and if the identified logical unit type is different from the prescribed logical unit type, maintains the one or more physical storage devices corresponding to the specified RAID group at spin-up status.

2. The storage system according to claim 1, wherein each of the plurality of physical storage devices is a disk device, and the disk device comprises a disk on which data is recorded, and a power-saving execution section which, in accordance with a spin-down indication, makes the rotating speed of this disk slower than the rotating speed at spin-up status, or makes the disk rotating speed zero,
wherein the power-saving indication receiving section receives the spin-down indication, and
wherein the power-saving controller indicates spin-down to one or more disk devices corresponding to the specified RAID group.

3. The storage system according to claim 2, wherein the power-saving controller updates a spin-down count for the respective disk devices when spin-down has been indicated, and
wherein the power saving controller, when the spin-down count exceeds a prescribed count threshold, prohibits the use of a disk device that exceeds the spin-down count, or sends a warning to the management device.

4. The storage system according to claim 1, wherein the prescribed logical unit type is either a first type or a second type,
wherein a logical unit of the first type is a logical unit for which the frequency of I/O is higher than that of a logical unit having a logical unit type other than the first type and the second type, and
a logical unit of the second type is a logical unit in which a failure has been detected, or a logical unit that corresponds to a RAID group or disk device in which a failure has been detected.

5. The storage system according to claim 4, further comprising:
a data copying section which forms a logical unit pair, one side of which is a primary logical unit, and the other side of which is a secondary logical unit, and copies data from the primary logical unit to the secondary logical unit,
wherein the data copying section is constituted such that when the logical unit pair has a first type pair status, the secondary logical unit is not updated even when there is an update to the primary logical unit, and when the logical unit pair has a second type pair status, the secondary logical unit is updated, and
wherein the logical unit of the first type is at least the secondary logical unit of the logical unit pair having the second type pair status.

6. The storage system according to claim 4, further comprising:
a cache memory area temporarily storing data that is the target of an I/O of an I/O command from the computer,
wherein data in the cache memory area is clean data which is data that is stored in the plurality of physical storage devices, and dirty data which is data that is not stored in the plurality of physical storage devices, and
when there is both a failure to write dirty data in the cache memory area to one or more physical storage devices corresponding to a logical unit constituting the write destination of this dirty data, and an error in this physical storage device, data is not stored in this physical storage device, and the failure system logical unit is a logical unit corresponding to the physical storage device that had this error, or a logical unit corresponding to the RAID group of this physical storage device, and is not the write destination logical unit of this dirty data when the writing of the dirty data in the cache memory area fails.

7. The storage system according to claim 1, wherein the power-saving controller maintains the one or more physical storage devices corresponding to the RAID group at spin-up status while a predetermined process is being executed, even when the identified logical unit type is the prescribed logical unit type.

8. The storage system according to claim 1, wherein the power-saving controller, when the identified logical unit type is the prescribed logical unit type, executes I/O monitoring which monitors an I/O command to a logical unit corresponding to the specified RAID group from the computer within a fixed period of time, and when the I/O command is received within this fixed period of time, maintains the one or more physical storage devices corresponding to the RAID group at spin-up status.

9. The storage system according to claim 8, wherein the power-saving controller determines if I/O or power saving takes priority, and
wherein if I/O has priority, executes I/O monitoring, and
wherein if power saving has priority, sends to either the computer or the management device an indication for processing an I/O hold, in which even when an I/O command specifying a logical unit corresponding to the specified storage device is received, this I/O command is not processed, or an unmount indication for unmounting a logical unit corresponding to the specified storage device in the upper-level computer.

10. The storage system according to claim 8, wherein two or more logical units of the plurality of logical units are provided to the computer as a single logical unit, and
when a logical unit corresponding to the specified storage device is a logical unit constituting an integrated logical unit which is the single virtual logical unit, the power-saving controller also executes the I/O monitoring for another logical unit constituting this integrated logical unit.

11. The storage system according to claim 1, wherein, when a failure is detected in a physical storage device of a certain RAID group of the plurality of RAID groups, the power-saving controller cancels power-saving to another physical storage device which belongs to this certain RAID group, and which is undergoing power-saving, executes recovery processing for this failure, and thereafter, subjects this other physical storage device to power-saving once again.

12. The storage system according to claim 1, further comprising:
an I/O controller for processing an I/O command received from the computer,
wherein the I/O controller does not process the received I/O command if one or more physical storage devices corresponding to a logical unit specified in the received I/O command are undergoing power-saving.

13. The storage system according to claim 12, wherein two or more logical units of the plurality of logical units are provided to the computer as a integrated logical unit, and
wherein even if one or more physical storage devices corresponding to a logical unit specified by the received I/O command is not undergoing power-saving, and if the logical unit is included in the integrated logical unit, and one or more physical storage devices corresponding to another logical unit in the integrated logical unit are undergoing power-saving, the I/O controller does not process the received I/O command.

14. The storage system according to claim 1, wherein the power-saving controller determines the number of physical storage devices for which power-saving is simultaneously cancelled, based on the number of physical storage devices whose status are power-saving.

15. The storage system according to claim 14, wherein the power-saving controller further controls the number of physical storage devices for which power-saving is simultaneously cancelled, based on the number of physical storage devices not undergoing power-saving are physical storage devices to which an I/O is generated.

16. The storage system according to claim 1, further comprising:
a cache memory area temporarily storing data which is the target of an I/O conforming to an I/O command from the computer,
wherein data in the cache memory area is clean data which is data that is stored in the plurality of physical storage devices, and dirty data which is data that is not stored in the plurality of physical storage devices, and
when there is a failure to write dirty data in the cache memory area to one or more physical storage devices corresponding to a logical unit constituting the write destination of this dirty data, the power-saving controller subjects this one or more physical storage devices to power-saving in a state in which this dirty data remains in the cache memory area.

17. The storage system according to claim 1, further comprising:
an event execution controller for controlling whether or not an event generated by the storage system is executed in accordance with whether or not a physical storage device related to this event is undergoing power-saving.

18. The storage system according to claim 1, further comprising:
an event execution controller for controlling whether or not an event generated by the storage system is executed in accordance with whether or not a physical storage device related to the event is undergoing power-saving,
wherein each of the plurality of physical storage devices is a disk device, and this disk device comprises a disk on which data is recorded, and a disk controller controlling the I/O of data to the disk, and the disk controller, upon receiving a spin-down indication, makes the rotating speed of this disk slower than the rotating speed at a spin-up, or makes this disk rotating speed zero,
wherein the prescribed logical unit type is either a first type or a second type, a logical unit of the first type is a logical unit for which the frequency of I/O is higher than that of a logical unit having a logical unit type other than the first type and the second type,
a logical unit of the failure system is a logical unit in which a failure has been detected, or a logical unit that corresponds to a RAID group or disk device in which a failure has been detected,
wherein the power-saving indication receiving section receives a spin-down indication from the management device,
wherein the power-saving controller, when the identified logical unit type the prescribed logical unit type, executes I/O monitoring which is monitoring an I/O command to a logical unit corresponding to the RAID group from the computer within a fixed period of time, and when the I/O command is received within this fixed period of time, maintains the one or more physical storage devices corresponding to the RAID group at spin-up status, and when this I/O command is not received within this fixed period of time, indicates a spin-down to one or more disk devices corresponding to the RAID group, and
wherein the event execution controller executes a prescribed type of event when the prescribed type of event is generated during the execution of the I/O monitoring, and does not execute the prescribed type of event when the execution of the I/O monitoring ends and a spin-down is indicated by the power-saving controller.

19. A power-saving method for a storage system, wherein a management device sends a power-saving indication to a storage system comprising a plurality of Redundant Array of Inexpensive Disks (RAID) groups including a plurality of physical storage devices which forms a plurality of RAID groups, the RAID groups in which a plurality of logical units are provided; and
wherein the storage system identifies a logical unit type a logical unit corresponding to the RAID group specified in the received power-saving indication, and determines whether or not the identified logical unit type a prescribed logical unit type, and if the logical unit type the prescribed logical unit type, performs power saving to one or more physical storage devices corresponding to the specified RAID group, and if the logical unit type not the prescribed logical unit type, maintains one or more physical storage devices corresponding to the RAID group at spin-up status.

* * * * *